(12) United States Patent
Tidd

(10) Patent No.: US 9,419,848 B1
(45) Date of Patent: Aug. 16, 2016

(54) SYSTEM FOR AND METHOD OF PROVIDING A DOCUMENT SHARING SERVICE IN COMBINATION WITH REMOTE ACCESS TO DOCUMENT APPLICATIONS

(75) Inventor: William Tidd, Alton Bay, NH (US)

(73) Assignee: hopTo Inc., Campbell, CA (US)

( * ) Notice: Subject to any disclaimer, the term of this patent is extended or adjusted under 35 U.S.C. 154(b) by 0 days.

(21) Appl. No.: 13/481,746

(22) Filed: May 25, 2012

(51) Int. Cl.
 *G06F 13/00* (2006.01)
 *H04L 29/06* (2006.01)

(52) U.S. Cl.
 CPC ...... *H04L 29/06401* (2013.01); *H04L 65/4015* (2013.01)

(58) Field of Classification Search
 CPC ... H04L 65/403; H04L 65/40; H04L 12/1822; H04L 67/104; H04L 29/06401; H04L 65/4015; G06Q 10/10
 USPC .................. 709/204–206, 217–219, 203; 715/751–759
 See application file for complete search history.

(56) References Cited

U.S. PATENT DOCUMENTS

| | | |
|---|---|---|
| 5,831,609 A | 11/1998 | London et al. |
| 5,898,419 A | 4/1999 | Liu |
| 5,978,834 A | 11/1999 | Simonoff et al. |
| 6,288,702 B1 | 9/2001 | Tachibana |
| 6,393,569 B1 | 5/2002 | Orenshteyn |
| 6,710,790 B1 | 3/2004 | Fagioli |
| 7,051,288 B2 | 5/2006 | Bennett et al. |
| 7,058,461 B2 | 6/2006 | Malizia |
| 7,188,181 B1 | 3/2007 | Squier et al. |
| 7,216,298 B1 | 5/2007 | Ballard et al. |
| 7,222,158 B2 | 5/2007 | Wexelblat |
| 7,249,175 B1 | 7/2007 | Donaldson |
| 7,353,252 B1 | 4/2008 | Yang et al. |
| 7,461,134 B2 | 12/2008 | Ambrose |
| 7,526,792 B2 | 4/2009 | Ross |
| 7,587,459 B2 | 9/2009 | Wewalaarachchi et al. |

(Continued)

FOREIGN PATENT DOCUMENTS

WO    WO 2010/135127    11/2010

OTHER PUBLICATIONS

U.S. Appl. No. 13/367,228 Final Office Action dated Jul. 23, 2013.

(Continued)

*Primary Examiner* — Kenneth R Coulter
(74) *Attorney, Agent, or Firm* — Polsinelli LLP

(57) ABSTRACT

A system for and methods of providing a document sharing service in combination with remote access to document editor and/or viewer applications is disclosed. A hosting service of a client-server computing system includes a network of one or more host computers, a document sharing server that further includes a document sharing service, and a document database for storing shared documents. Methods of the disclosure include a method of creating a document and saving to the document sharing service, a method of a user accessing a document available through the document sharing service, and a method of selecting a computer of the client-server computing system on which to launch the requested document editor/viewer application. Further, the client-server computing system supports three classes of client devices, wherein each of the three classes provides unique functionality with respect to the document sharing service.

22 Claims, 9 Drawing Sheets

(56) References Cited

U.S. PATENT DOCUMENTS

| | | |
|---|---|---|
| 7,647,411 B1 | 1/2010 | Schiavone et al. |
| 7,716,302 B2 | 5/2010 | Maze et al. |
| 7,739,693 B2 | 6/2010 | Bernhard et al. |
| 7,920,528 B2 | 4/2011 | Karaoguz et al. |
| 8,073,855 B2 | 12/2011 | Nagoya |
| 8,219,807 B1 | 7/2012 | Danoyan et al. |
| 8,281,410 B1 | 10/2012 | Sobel et al. |
| 8,427,445 B2 | 4/2013 | Kennedy |
| 8,438,473 B2 | 5/2013 | Mak et al. |
| 8,527,978 B1 | 9/2013 | Sallam |
| 8,688,734 B1 | 4/2014 | Tidd |
| 8,694,507 B2 | 4/2014 | Meyerzon et al. |
| 8,713,658 B1 | 4/2014 | Tidd |
| 8,738,814 B1 | 5/2014 | Cronin |
| 8,739,074 B2 | 5/2014 | Kinoshita |
| 8,745,505 B2 | 6/2014 | Tam |
| 8,769,011 B2 | 7/2014 | Baird et al. |
| 8,799,777 B1 | 8/2014 | Lee |
| 8,856,907 B1 | 10/2014 | Tidd |
| 8,863,232 B1 | 10/2014 | Tidd |
| 8,887,132 B1 | 11/2014 | Hunter |
| 8,950,007 B1 | 2/2015 | Teal et al. |
| 8,954,887 B1 | 2/2015 | Tseng |
| 9,165,160 B1 | 10/2015 | Tidd |
| 9,203,791 B1 | 12/2015 | Olomskiy |
| 9,239,812 B1 | 1/2016 | Berlin |
| 2001/0023438 A1 | 9/2001 | Ishida |
| 2002/0091697 A1 | 7/2002 | Huang et al. |
| 2002/0130900 A1 | 9/2002 | Davis |
| 2002/0158921 A1 | 10/2002 | Silverstein |
| 2003/0058277 A1 | 3/2003 | Bowman-Amuah |
| 2003/0084112 A1 | 5/2003 | Curray et al. |
| 2003/0163448 A1 | 8/2003 | Kilemba et al. |
| 2004/0080771 A1 | 4/2004 | Mihira et al. |
| 2004/0163046 A1 | 8/2004 | Chu et al. |
| 2004/0190049 A1 | 9/2004 | Itoh |
| 2005/0044483 A1 | 2/2005 | Maze et al. |
| 2005/0093868 A1 | 5/2005 | Hinckley |
| 2005/0102636 A1 | 5/2005 | McKeon et al. |
| 2005/0114760 A1* | 5/2005 | Arregui et al. ............... 715/513 |
| 2005/0138569 A1 | 6/2005 | Baxter et al. |
| 2005/0149857 A1 | 7/2005 | Negishi et al. |
| 2005/0177730 A1 | 8/2005 | Davenport et al. |
| 2005/0198299 A1 | 9/2005 | Beck et al. |
| 2005/0210418 A1 | 9/2005 | Marvit et al. |
| 2005/0226192 A1 | 10/2005 | Red et al. |
| 2006/0039012 A1 | 2/2006 | Ferlitsch |
| 2006/0047780 A1 | 3/2006 | Patnude |
| 2006/0059253 A1 | 3/2006 | Goodman et al. |
| 2006/0075224 A1 | 4/2006 | Tao |
| 2006/0150256 A1 | 7/2006 | Fanton et al. |
| 2006/0161846 A1 | 7/2006 | Van Leeuwen |
| 2006/0250578 A1 | 11/2006 | Pohl et al. |
| 2006/0253558 A1 | 11/2006 | Acree et al. |
| 2007/0061264 A1 | 3/2007 | Yeung et al. |
| 2007/0078994 A1 | 4/2007 | Wilson et al. |
| 2007/0101297 A1 | 5/2007 | Forstall et al. |
| 2007/0113187 A1 | 5/2007 | McMullen et al. |
| 2007/0121584 A1 | 5/2007 | Qiu et al. |
| 2007/0174410 A1 | 7/2007 | Croft et al. |
| 2007/0198950 A1 | 8/2007 | Dodge |
| 2007/0280459 A1 | 12/2007 | Yee et al. |
| 2007/0283446 A1 | 12/2007 | Yami et al. |
| 2008/0016504 A1 | 1/2008 | Cheng et al. |
| 2008/0071860 A1 | 3/2008 | Dal Canto et al. |
| 2008/0091550 A1 | 4/2008 | Zacarias et al. |
| 2008/0137131 A1 | 6/2008 | Cavill et al. |
| 2008/0167005 A1 | 7/2008 | Gilzean et al. |
| 2008/0209537 A1 | 8/2008 | Wong et al. |
| 2008/0270516 A1 | 10/2008 | Ragnet et al. |
| 2009/0013045 A1 | 1/2009 | Maes et al. |
| 2009/0013273 A1 | 1/2009 | Fuchs |
| 2009/0021387 A1 | 1/2009 | Hosono |
| 2009/0024626 A1 | 1/2009 | Takei |
| 2009/0027334 A1 | 1/2009 | Foulk et al. |
| 2009/0037976 A1 | 2/2009 | Teo et al. |
| 2009/0070404 A1* | 3/2009 | Mazzaferri ............... 709/202 |
| 2009/0083852 A1 | 3/2009 | Kuo et al. |
| 2009/0132509 A1 | 5/2009 | Nagoya |
| 2009/0144362 A1 | 6/2009 | Richmond et al. |
| 2009/0177791 A1 | 7/2009 | Edelstein et al. |
| 2009/0180777 A1 | 7/2009 | Bernard et al. |
| 2009/0182501 A1 | 7/2009 | Fyke |
| 2009/0187654 A1 | 7/2009 | Raja et al. |
| 2009/0187857 A1 | 7/2009 | Tanaka |
| 2009/0204711 A1 | 8/2009 | Binyamin |
| 2009/0231285 A1 | 9/2009 | Duncan |
| 2009/0235347 A1 | 9/2009 | Syed et al. |
| 2009/0245176 A1 | 10/2009 | Balasubramanian et al. |
| 2009/0300129 A1 | 12/2009 | Golub |
| 2010/0005142 A1 | 1/2010 | Xiao et al. |
| 2010/0020025 A1 | 1/2010 | Lemort et al. |
| 2010/0058431 A1 | 3/2010 | McCorkendale et al. |
| 2010/0088367 A1 | 4/2010 | Brown et al. |
| 2010/0138780 A1 | 6/2010 | Marano et al. |
| 2010/0146504 A1 | 6/2010 | Tang et al. |
| 2010/0153581 A1 | 6/2010 | Nagarajan et al. |
| 2010/0162163 A1 | 6/2010 | Wang et al. |
| 2010/0214302 A1 | 8/2010 | Melcher et al. |
| 2010/0228963 A1 | 9/2010 | Kassab et al. |
| 2010/0268762 A1 | 10/2010 | Pahlavan et al. |
| 2010/0269039 A1 | 10/2010 | Pahlavan et al. |
| 2010/0269152 A1 | 10/2010 | Pahlavan et al. |
| 2010/0293499 A1 | 11/2010 | Young et al. |
| 2010/0295817 A1 | 11/2010 | Nicholson et al. |
| 2010/0321406 A1 | 12/2010 | Iwase |
| 2010/0325716 A1 | 12/2010 | Hong et al. |
| 2011/0010668 A1 | 1/2011 | Feldstein |
| 2011/0029772 A1 | 2/2011 | Fanton et al. |
| 2011/0099297 A1 | 4/2011 | Hayton |
| 2011/0113427 A1 | 5/2011 | Dotan |
| 2011/0137974 A1 | 6/2011 | Momchilov |
| 2011/0138295 A1 | 6/2011 | Momchilov et al. |
| 2011/0138314 A1 | 6/2011 | Mir et al. |
| 2011/0141031 A1 | 6/2011 | McCullough et al. |
| 2011/0145728 A1 | 6/2011 | Bishop |
| 2011/0154212 A1 | 6/2011 | Gharpure et al. |
| 2011/0191407 A1 | 8/2011 | Fu et al. |
| 2011/0197051 A1 | 8/2011 | Mullin et al. |
| 2011/0209064 A1 | 8/2011 | Jorgensen et al. |
| 2011/0258271 A1* | 10/2011 | Gaquin ............... 709/206 |
| 2011/0264463 A1 | 10/2011 | Kincaid |
| 2011/0270936 A1 | 11/2011 | Guthrie et al. |
| 2011/0277027 A1 | 11/2011 | Hayton et al. |
| 2011/0279829 A1 | 11/2011 | Chang et al. |
| 2011/0302495 A1 | 12/2011 | Pinto et al. |
| 2011/0307614 A1 | 12/2011 | Bernardi et al. |
| 2011/0314093 A1 | 12/2011 | Sheu et al. |
| 2012/0011472 A1 | 1/2012 | Ohkubo |
| 2012/0011578 A1 | 1/2012 | Hinton et al. |
| 2012/0023593 A1 | 1/2012 | Puder et al. |
| 2012/0030584 A1 | 2/2012 | Bian |
| 2012/0054671 A1 | 3/2012 | Thompson et al. |
| 2012/0066607 A1 | 3/2012 | Song et al. |
| 2012/0066695 A1 | 3/2012 | Berezansky et al. |
| 2012/0066762 A1 | 3/2012 | Todorovic |
| 2012/0084713 A1 | 4/2012 | Desai et al. |
| 2012/0092277 A1 | 4/2012 | Momchilov |
| 2012/0096389 A1 | 4/2012 | Flam et al. |
| 2012/0151374 A1 | 6/2012 | Liu |
| 2012/0159570 A1 | 6/2012 | Reierson et al. |
| 2012/0173673 A1* | 7/2012 | Dietrich et al. ............... 709/218 |
| 2012/0173732 A1 | 7/2012 | Sullivan |
| 2012/0185527 A1 | 7/2012 | Jaudon et al. |
| 2012/0185767 A1 | 7/2012 | Schlegel |
| 2012/0226742 A1 | 9/2012 | Momchilov et al. |
| 2012/0240054 A1 | 9/2012 | Webber |
| 2012/0246645 A1 | 9/2012 | Iikura et al. |
| 2012/0297471 A1 | 11/2012 | Smithson |
| 2012/0304061 A1 | 11/2012 | Hoover |
| 2012/0304168 A1 | 11/2012 | Raj Seeniraj et al. |
| 2012/0311070 A1 | 12/2012 | BianRosa et al. |
| 2012/0324365 A1 | 12/2012 | Momchilov et al. |
| 2013/0024779 A1 | 1/2013 | Bechtel et al. |

(56) References Cited

U.S. PATENT DOCUMENTS

| | | |
|---|---|---|
| 2013/0024812 A1 | 1/2013 | Reeves et al. |
| 2013/0060842 A1 | 3/2013 | Grossman |
| 2013/0097550 A1 | 4/2013 | Grossman et al. |
| 2013/0110828 A1 | 5/2013 | Meyerzon et al. |
| 2013/0132856 A1 | 5/2013 | Binyamin et al. |
| 2013/0138810 A1 | 5/2013 | Binyamin et al. |
| 2013/0198600 A1* | 8/2013 | Lockhart et al. ............. 715/230 |
| 2013/0219338 A1 | 8/2013 | VanBlon |
| 2013/0254675 A1 | 9/2013 | de Andrade et al. |
| 2013/0254761 A1 | 9/2013 | Reddy et al. |
| 2013/0290856 A1 | 10/2013 | Beveridge et al. |
| 2013/0305344 A1 | 11/2013 | Alicherry et al. |
| 2013/0311990 A1 | 11/2013 | Tang et al. |
| 2013/0318582 A1* | 11/2013 | McCann et al. .................. 726/7 |
| 2013/0326583 A1 | 12/2013 | Freihold et al. |
| 2014/0012574 A1 | 1/2014 | Pasupalak et al. |
| 2014/0026057 A1 | 1/2014 | Kimpton et al. |
| 2014/0032644 A1 | 1/2014 | Saxena et al. |
| 2014/0074881 A1 | 3/2014 | Meyerzon et al. |
| 2014/0143846 A1 | 5/2014 | Tidd |
| 2014/0143847 A1 | 5/2014 | Tidd |
| 2014/0165176 A1 | 6/2014 | Ow |
| 2014/0188977 A1 | 7/2014 | Song et al. |
| 2014/0325054 A1 | 10/2014 | Agrawal et al. |
| 2015/0074199 A1 | 3/2015 | Lv |

OTHER PUBLICATIONS

U.S. Appl. No. 13/367,228 Office Action dated Jan. 30, 2013.
U.S. Appl. No. 13/367,239 Office Action dated Jun. 24, 2013.
U.S. Appl. No. 13/481,742 Office Action dated May 9, 2013.
U.S. Appl. No. 13/481,752 Office Action dated May 9, 2013.
U.S. Appl. No. 13/367,239 Final Office Action dated Nov. 14, 2013.
U.S. Appl. No. 13/481,742 Final Office Action dated Sep. 4, 2013.
U.S. Appl. No. 13/481,752 Final Office Action dated Sep. 4, 2013.
U.S. Appl. No. 13/753,474 Office Action dated Nov. 21, 2013.
U.S. Appl. No. 14/150,680, William Tidd, System for and Method of Providing Single Sign-On (SSO) Capability in an Application Publishing Environment, filed Jan. 8, 2014.
U.S. Appl. No. 14/150,684, William Tidd, System for and Method of Providing Single Sign-On (SSO) Capability in an Application Publishing Environment, filed Jan. 8, 2014.
U.S. Appl. No. 14/151,222, William Tidd, System for and Method of Providing Single Sign-On (SSO) Capability in an Application Publishing Environment, filed Jan. 9, 2014.
U.S. Appl. No. 14/152,303, William Tidd, System for and Method of Providing Single Sign-On (SSO) Capability in an Application Publishing, filed Jan. 10, 2014.
U.S. Appl. No. 14/152,306, William Tidd, System for and Method of Providing Single Sign-On (SSO) Capability in an Application Publishing Environment, filed Jan. 10, 2014.
U.S. Appl. No. 13/753,474 Final Office Action mailed Mar. 6, 2014.
U.S. Appl. No. 13/570,106 Office Action mailed Feb. 27, 2014.
U.S. Appl. No. 13/570,115 Office Action mailed Feb. 11, 2014.
U.S. Appl. No. 13/481,743 Office Action mailed Jan. 14, 2015.
U.S. Appl. No. 13/570,108 Office Action mailed May 13, 2014.
U.S. Appl. No. 14/332,660 Office Action mailed Mar. 7, 2015.
U.S. Appl. No. 13/481,745 Office Action mailed Feb. 10, 2015.
U.S. Appl. No. 13/753,474 Office Action mailed Mar. 27, 2015.
U.S. Appl. No. 13/570,108 Office Action mailed Apr. 1, 2015.
U.S. Appl. No. 13/570,110 Office Action mailed Mar. 30, 2015.
U.S. Appl. No. 13/570,111 Office Action mailed Apr. 1, 2015.
U.S. Appl. No. 13/570,113 Office Action mailed Apr. 3, 2015.
U.S. Appl. No. 14/332,660, William Tidd, System for and Methods of Controlling User Access to Applications and/or Programs of a Computer, filed Jul. 16, 2014.
U.S. Appl. No. 14/176,895, William Tidd, System for and Methods of Controlling User Access and/or Visibility to Directories and Files of a Computer, filed Feb. 10, 2014.
U.S. Appl. No. 13/481,743, William Tidd, System for and Method of Providing a Document Sharing Service in Combination with Remote Access to Document Applications, filed May 25, 2012.
U.S. Appl. No. 13/481,745, William Tidd, System for and Method of Providing a Document Sharing Service in Combination with Remote Access to Document Applications, filed May 25, 2012.
U.S. Appl. No. 13/481,751, John Cronin, System for and Method of Processing User Interface Graphics Between a Client Device and an Application Host Computer, filed May 25, 2012.
U.S. Appl. No. 14/445,319, William Tidd, System for and Methods of Providing Single Sign-On (SSO) Capability in an Application Publishing and/or Document Sharing Environment, filed Jul. 29, 2014.
U.S. Appl. No. 13/753,474, Robert W. Currey, System for and Methods of Translating Accelerometer Information to Mouse-Based I/O Commands in a Remote Access Application Publishing Environment, filed Jan. 29, 2013.
U.S. Appl. No. 13/753,475, Robert W. Currey, System for and Method of Cross-Platform User Notification in an Application Publishing Environment, filed Jan. 29, 2013.
U.S. Appl. No. 13/753,476, Robert W. Currey, System for and Method of Cross Platform User Notification in an Application Publishing Environment, filed Jan. 29, 2013.
U.S. Appl. No. 13/753,477, Robert W. Currey, System for and Method of Rendering Remote Applications on a Client Device in an Application Publishing Environment, filed Jan. 29, 2013.
U.S. Appl. No. 13/753,478, Robert W. Currey, System for and Method of Rendering Remote Applications on a Client Device in an Application Publishing Environment, filed Jan. 29, 2013.
U.S. Appl. No. 13/753,479, Robert W. Currey, System for and Method of Rendering Remote Applications on a Client Device in an Application Publishing Environment, filed Jan. 29, 2013.
U.S. Appl. No. 13/570,103, Christoph Berlin, System for and Method of Providing a Universal I/O Command Translation Framework in an Application Publishing Environment, filed Aug. 8, 2012.
U.S. Appl. No. 13/570,106, Christoph Berlin, System for and Method of Providing a Universal I/O Command Translation Framework in an Application Publishing Environment, filed Aug. 8, 2012.
U.S. Appl. No. 13/570,108, Christoph Berlin, System for and Method of Providing a Universal I/O Command Translation Framework in an Application Publishing Environment, filed Aug. 8, 2012.
U.S. Appl. No. 13/570,110, Christoph Berlin, System for and Method of Providing Alternating Desktop Views on a Client Device in an Application Publishing Environment, filed Aug. 8, 2012.
U.S. Appl. No. 13/570,111, Christoph Berlin, System for and Method of Providing Alternating Desktop Views on a Client Device in an Application Publishing Environment, filed Aug. 8, 2012.
U.S. Appl. No. 13/570,113, Christoph Berlin, System for and Method of Providing Alternating Desktop Views on a Client Device in a Cloud-Based Application Publishing Environment, filed Aug. 8, 2012.
U.S. Appl. No. 13/570,115, Christoph Berlin, System for and Method of Providing Alternating Desktop Views on a Client Device in a Cloud-Based Application Publishing Environment, filed Aug. 8, 2012.
U.S. Appl. No. 13/668,097, William Tidd, System for and Methods of Providing Bidirectional Communication Between a Web Application and an Application Hosted in an Application Publishing Environment, filed Nov. 2, 2012.
U.S. Appl. No. 13/668,100, William Tidd, Client Computing System in a Client-Server Computing Environment for Providing Bidirectional Communication Between a Web Application and a Hosted Application, filed Nov. 2, 2012.
U.S. Appl. No. 13/688,105, William Tidd, Server Computing System in a Client-Server Computing Environment for Providing Bidirectional Communication Between a Hosted Application and a Web Application, filed Nov. 2, 2012.
U.S. Appl. No. 13/753,477 Office Action mailed Jul. 29, 2015.
U.S. Appl. No. 13/753,478 Office Action mailed Aug. 19, 2015.
U.S. Appl. No. 13/753,479 Office Action mailed Aug. 12, 2015.
U.S. Appl. No. 13/668,105 Office Action mailed Jul. 8, 2015.
U.S. Appl. No. 14/884,571, William Tidd, System for and Methods of Controlling User Access and/or Visibility to Directories and Files of a Computer, filed Oct. 15, 2015.
U.S. Appl. No. 13/481,751 Final Office Action mailed Sep. 3, 2014.
U.S. Appl. No. 13/753,474 Final Office Action mailed Oct. 6, 2014.
U.S. Appl. No. 13/570,106 Final Office Action mailed Sep. 15, 2014.

(56) References Cited

OTHER PUBLICATIONS

U.S. Appl. No. 13/570,108 Office Action mailed Oct. 10, 2014.
U.S. Appl. No. 13/668,097 Office Action mailed Sep. 12, 2014.
U.S. Appl. No. 13/668,100 Office Action mailed Sep. 10, 2014.
U.S. Appl. No. 13/481,751 Office Action dated Dec. 30, 2013.
Park et al.; "Role-based access control on the web"; ACM transactions on information and system security; vol. 4, No. 1, Feb. 2001. p. 37-71, 35 pages.
U.S. Appl. No. 13/753,474 Office Action mailed Jun. 11, 2014.
U.S. Appl. No. 13/570,115 Final Office Action mailed Jun. 30, 2014.
U.S. Appl. No. 13/481,751 Office Action mailed Sep. 17, 2015.
U.S. Appl. No. 14/332,660 Final Office Action mailed Nov. 3, 2015.
U.S. Appl. No. 13/481,743 Office Action mailed Oct. 23, 2015.
U.S. Appl. No. 13/570,108 Final Office Action mailed Oct. 29, 2015.
Damien, "How to Switch to Desktop Mode for Your Browser in Honeycomb Tablet [Android]." Oct. 4, 2011, http://www.maketecheasier.com/switch-to-desktop-mode-for-honeycomb-tablet-android/.
Kessler, How to use Safari's new 'Reader', Jun. 9, 2010, http://www.cnet.com/news/how-to-use-safaris-new-reader/.
Mobotap, "Add-on Digest: Desktop Toggle," May 16, 2012, http://dolphin.com/add-on-digest-desktop-toggle/.
Sieber, "5 Must Have Add-Ons for the Dolphin Browser on Your Android Honeycomb Tablet," Oct. 25, 2011, http://www.makeuseof.com/tag/5-addons-dolphin-browser-android-honeycomb-tablet/.
Xue, "Windows 8 How to: 1. Switch Between Metro UI and Desktop Mode," Mar. 7, 2012, http://blogs.msdn.com/b/zxue/archive/2012/03/07win8-howto-1-switch-between-metro-ui-and-desktop.aspx.
U.S. Appl. No. 14/152,303 Office Action mailed Nov. 13, 2015.
U.S. Appl. No. 13/481,745 Final Office Action mailed Nov. 19, 2015.
U.S. Appl. No. 14/445,319 Office Action mailed Dec. 14, 2015.
U.S. Appl. No. 13/570,103 Final Office Action mailed Dec. 31, 2015.
U.S. Appl. No. 13/570,110 Final Office Action mailed Dec. 21, 2015.
U.S. Appl. No. 13/570,111 Final Office Action mailed Dec. 18, 2015.
U.S. Appl. No. 13/570,113 Final Office Action mailed Dec. 18, 2015.
U.S. Appl. No. 13/753,475 Office Action mailed Apr. 24, 2015.
U.S. Appl. No. 13/753,476 Office Action mailed Apr. 22, 2015.
U.S. Appl. No. 13/570,103 Office Action mailed Apr. 24, 2015.
U.S. Appl. No. 13/570,115 Office Action mailed Jun. 19, 2015.
U.S. Appl. No. 13/668,097 Final Office Action mailed Jun. 16, 2015.
U.S. Appl. No. 13/668,100 Final Office Action mailed Jun. 17, 2015.
U.S. Appl. No. 14/150,680 Office Action mailed Mar. 29, 2016.
U.S. Appl. No. 14/150,684 Office Action mailed Apr. 12, 2016.
U.S. Appl. No. 14/151,222 Office Action mailed Mar. 30, 2016.
U.S. Appl. No. 14/152,306 Office Action mailed Mar. 30, 2016.
U.S. Appl. No. 13/753,475 Final Office Action mailed Mar. 3, 2016.
U.S. Appl. No. 13/753,476 Final Office Action mailed Mar. 2, 2016.
U.S. Appl. No. 13/753,478 Final Office Action mailed Mar. 29, 2016.
U.S. Appl. No. 13/753,479 Final Office Action mailed Apr. 18, 2016.
U.S. Appl. No. 13/668,097 Office Action mailed Feb. 25, 2016.
U.S. Appl. No. 13/668,100 Office Action mailed Feb. 26, 2016.

* cited by examiner

SYSTEM FOR AND METHOD OF PROVIDING
A DOCUMENT SHARING SERVICE IN
COMBINATION WITH REMOTE ACCESS TO
DOCUMENT APPLICATIONS

TECHNICAL FIELD

Various inventive embodiments disclosed herein relate generally to document sharing systems. In particular, embodiments disclosed herein relate to a system for and methods of providing a document sharing service in combination with remote access to document editor and/or viewer applications.

BACKGROUND

Currently, web-based file hosting services exist in which cloud storage is used to enable users to create, store, and share files and folders with others across the Internet using file synchronization. In such a system, the service allows users to upload and save documents to the cloud. Then the documents that are in the cloud can be access from the users' computers. Users can also share documents with other users.

Current document sharing systems work well until a user tries to access a document using a client device (e.g., any computing device) that does not have the document editor and/or viewer application needed for the document format of interest. For example, if a user is attempting to edit/view an AutoCAD® document through a document sharing system and the user's computer does not have the AutoCAD® application installed and running natively thereon, the user will be unable to open the AutoCAD® document. Therefore, for conventional document sharing systems to work, it is required that the user's client device have the needed document application installed and running locally. This is of particular limitation on certain types of client devices, such as tablet computing devices, handheld computing devices, and mobile phones, which may not support any application that can view or edit a particular document format.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure is a system for and methods of providing a document sharing service in combination with remote access to document editor and/or viewer applications. The document sharing service of the disclosure allows users to access a document from a centralized document database using his/her client device (e.g., any computing device) even when the client device does not have the document editor/viewer application needed for the document format of interest. Namely, if a user is attempting to edit/view a document of a certain file format through the document sharing service and the user's client device does not support the particular file format, the document sharing service (1) selects a computer in the system that has the needed document editor/viewer application (2), if necessary, moves the document to the selected computer, and (3) "remotes" the user interface for the document editor/viewer application to the user's client device.

For example, if a user is attempting to edit/view an computer-aided design (CAD) drawing through the document sharing service of the disclosure and the user's client device does not have the AutoCAD® application installed and running natively on his/her client device, the document sharing service (1) selects a computer in the system that is running the AutoCAD® application (2) if necessary, moves the CAD drawing to the selected computer, and then (3) remotes the user interface for the AutoCAD® application to the user's client device.

Further, the document sharing service of the disclosure supports three classes of client devices, meaning three classes of user devices, by which a user may access documents:

(1) a class I client device that has a certain set of document editor/viewer applications installed thereon and that includes a remote access service that allows the class I client device to act as an application host computer;

(2) a class II device that has a certain set of document editor/viewer applications installed thereon, but that does not include a remote access service; and (3) a class III client device that has no or a limited set of document editor/viewer applications installed thereon.

Accordingly, the class I client device has the greatest amount of functionality, the class II client device has a lower amount of functionality than the class I client device, and the class III client device has a yet lower amount of functionality than the class II client device. The document sharing service of the disclosure provides advantage over conventional document sharing systems in that conventional document sharing systems only support the equivalent of the class II and class III client devices, and do not support class I client devices.

Figure 1:
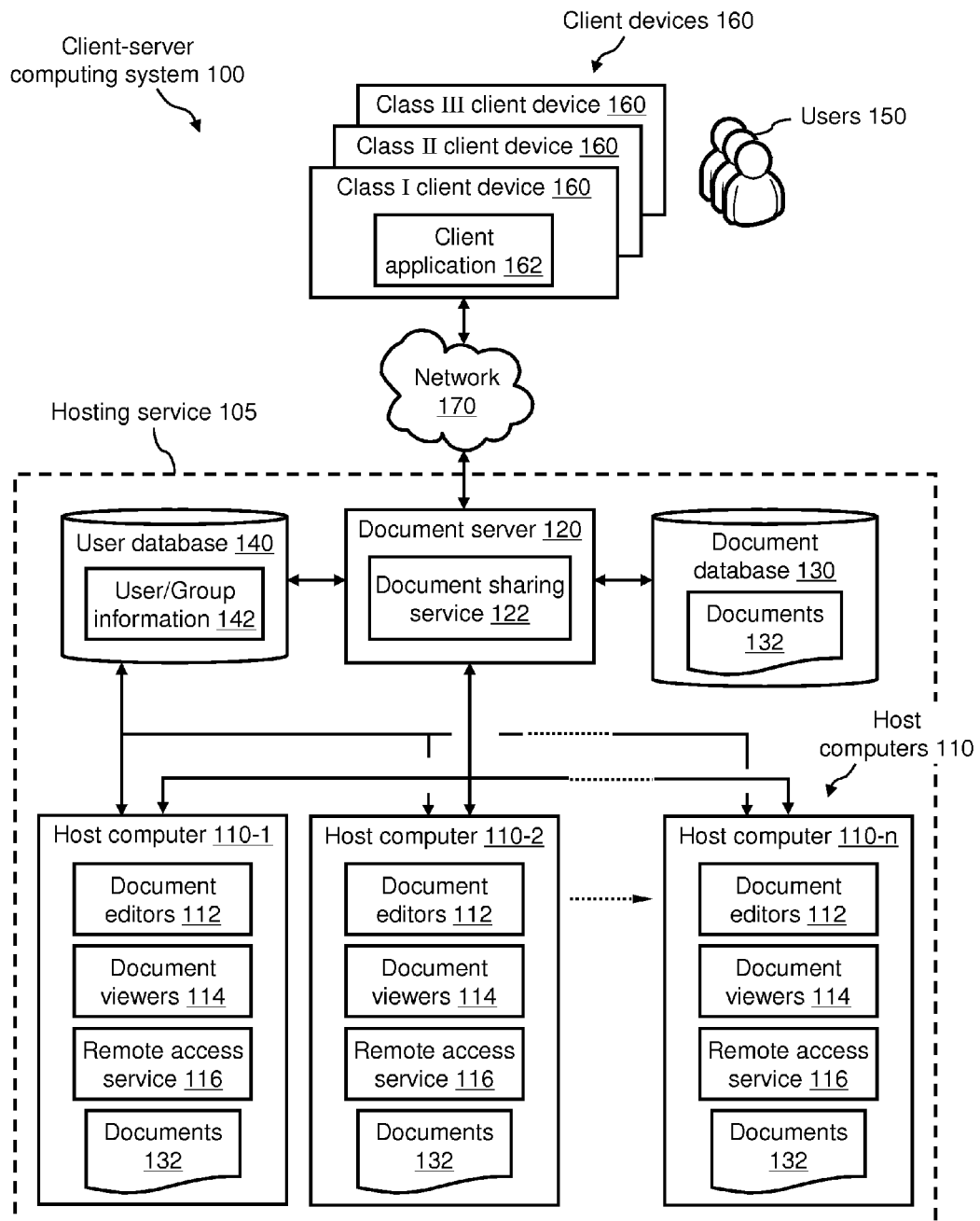
FIG. 1 illustrates a block diagram of a client-server computing system for providing a document sharing service in combination with remote access to document editor and/or viewer applications, according to the present disclosure.

FIG. 1 illustrates a block diagram of a client-server computing system 100 for providing a document sharing service in combination with remote access to document editor and/or viewer applications. Client-server computing system 100 includes a hosting service 105, which is a cluster of computing resources that support a document sharing service for users who are accessing hosting service 105 remotely. Namely, users may create documents and store the documents in centralized storage of hosting service 105. Additionally, users may create and store documents on class I devices. In both cases, documents may be shared between users via hosting service 105.

In one example, hosting service 105 includes a network of one or more host computers 110, i.e., host computers 110-1 through 110-n; a document server 120; a document database 130; and a user database 140. Host computers 110-1 through 110-n may be connected to document server 120 and user database 140 via, for example, a TCP connection. The TCP connection may be a standard TCP connection with no encryption or a TCP connection with encryption.

One or more users 150 are associated with client-server computing system 100. Users 150 may be individual users and/or groups of users and, thus, hereafter it may be understood that any reference to users 150 means individual users or user groups (i.e., groups of users 150). Users 150 may access hosting service 105 via any combination of one or more classes of client devices 160, which are connected to hosting service 105 via a network 170. For example, client devices 160 may include any combinations of class I client devices 160, class II client devices 160, and class III client devices 160, which are described in more detail with reference to FIGS. 2A, 2B, and 2C, respectively.

Network 170 may be, for example, a local area network (LAN) and/or a wide area network (WAN) for connecting to the Internet. Entities of client-server computing system 100 may connect to network 170 by any wired and/or wireless means. Client-server computing system 100 may be implemented using standard client-server architecture between hosting service 105 and client devices 160.

Each host computer 110 is a computer on which document editor and/or document viewer applications run. For example, in a remote access system, such as client-server computing system 100, the "remoting" software is installed and executing (i.e., "running") on each host computer 110, which is software that allows users 150 to remotely access document editor and/or document viewer applications that are installed on each host computer 110. By way of example, a set of document editors 112 and/or a set of document viewers 114 are installed on each host computer 110. Namely, individual instances and/or types of document editor and/or document viewer applications on each host computer 110 is represented by document editors 112 and document viewers 114. Document editors 112 may include any types of document editors, such as, but not limited to, a plain text editor, such as Notepad; the Microsoft® Office suite of programs, such as Microsoft® Word, Microsoft® Excel, Microsoft® PowerPoint; Microsoft® Visio; computer-aided design (CAD) applications, such as Autodesk® AutoCAD® and Cadence® Virtuoso®; photo editors, such as Microsoft® Paint and Adobe® Photoshop®; and Adobe® Illustrator®. Document viewers 114 may include any types of document viewers, such as, but not limited to, the Microsoft® PowerPoint viewer, the Microsoft® Visio viewer; the AutoCAD® viewer, the Adobe® Acrobat Reader, and any type of image viewer.

Using an example of three host computers 110-1, 110-2, and 110-3, instances of the same or different types of document editors 112 and document viewers 114 may be installed and running on each of the host computers 110-1, 110-2, and 110-3. For example, the Microsoft® Office suite of programs may be installed and running on all three host computers 110-1, 110-2, and 110-3. Adobe® Acrobat Reader may be installed and running on host computers 110-2 and 110-3, but not on host computer 110-1. Autodesk® AutoCAD® and the AutoCAD® viewer may be installed and running only on host computer 110-2. Microsoft® Visio and the Microsoft® Visio viewer may be installed and running on host computers 110-1 and 110-3, but not on host computer 110-2, and so on.

Each host computer 110 further includes a remote access service 116. Remote access service 116 is the application or process that manages the user access process at the host computer 110 whenever a document editor/viewer access request is received from a client device 160 of a certain user 150 via document server 120. Additionally, remote access service 116 provides an application publishing service. Namely, at each host computer 110, remote access service 116 is used to publish its document editors 112 and document viewers 114 to users 150. The remote access service 116 is an application running on each host computer 110 that is capable of starting a remote session in which applications can be run and displayed to a user 150 at his/her client device 160, which is a remote device. The remote access service 116 application manages the communication of each host computer 110 with the client device 160 with respect to creating and displaying host sessions on behalf of users 150.

Document server 120 is used as the gateway into hosting service 105. Namely, document server 120 provides the interface between client devices 160 and host computers 110. As such, document editors 112 and document viewers 114 of host computers 110-1 through 110-n is delivered to client devices 160 via document server 120. More specifically, document server 120 includes a document sharing service 122. Document sharing service 122 may be implemented as a web application that is accessible by client devices 160 via, for example, the Internet (e.g., network 170). Document sharing service 122 controls access to host computers 110 and any other entities of hosting service 105. More particularly, under the control of document sharing service 122, document editors 112 and document viewers 114 of host computers 110 shall be visible to and accessible by client devices 160 via network 170. For example, users 150 authenticate to document server 120 using document sharing service 122. Once authenticated, based on access rights and permissions, users 150 are allowed access to document editors 112 and document viewers 114 of host computers 110-1 through 110-n that are connected to document server 120.

Each client device 160 includes a client application 162. Client application 162 is used to provide a user interface to document sharing service 122 of document server 120. Namely, client application 162 is the component that is the counterpart to document sharing service 122 of document server 120. Client application 162 may be implemented as a web application and run in a web browser, such as Internet Explorer. However, client application 162 may be implemented by other means, such as a .NET application, a light weight desktop application, a mobile app, and the like.

Document sharing service 122 of document server 120 is the first process that client application 162 of client devices 160 connects to. The purpose of document sharing service 122 is to authenticate users 150 and keep track of what each individual user 150 is allowed to access. Namely, document sharing service 122 is used to enforce the access rights and limitations that a system administrator (not shown) has defined.

Document database 130 provides a centralize document storage means in hosting service 105. Namely, document database 130 is used for storing a repository of documents 132. Documents 132 may be any documents created and/or processed using document editors 112 and document viewers 114. Examples of types of documents 132 may include, but are not limited to, .txt files, .rtf files, .wpd files, .wps files, .doc files, .ppt files, .xls files, .htm files, .html files, .pdf files, .jpg files, .tiff files, .gif files, .bmp files, .vsd files, .xml file, .ai files, .dwg files, and .dxf files, to name a few. Using client devices 160, documents 132 may be created by users 150, then saved to document database 130 and shared with other users 150.

User/group information 142 may be stored in user database 140. A system administrator (not shown) creates and defines user/group information 142. Additionally, if allowed by the administrator, users may create their own accounts and groups. User/group information 142 may contain, for example, account information, user names, group names, user/group credentials, locations of user/group profiles (e.g., file paths), and the like.

Client-server computing system 100, and more particularly hosting service 105, may support a cloud computing environment. In a cloud computing environment, document server 120 is the cloud server. Further, hosting service 105 of client-server computing system 100 is not limited to one document server 120 only. Hosting service 105 may include any number of document servers 120 (or cloud servers).

Figure 2A:
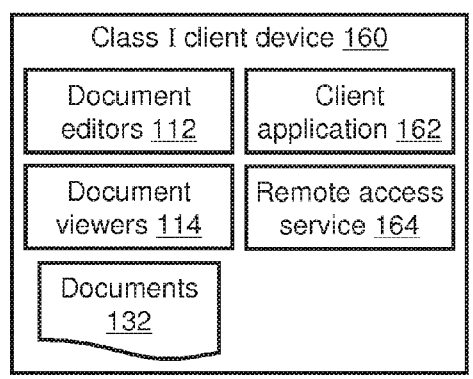
FIGS. 2A, 2B, and 2C illustrate block diagrams of examples of a class I client device, a class II client device, and a class III client device, respectively, of the client-server computing system, according to the present disclosure.
Figure 2B:
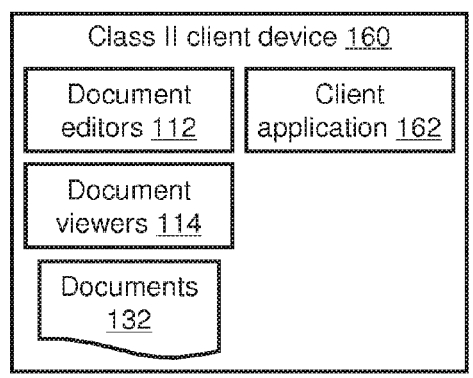
Figure 2C:
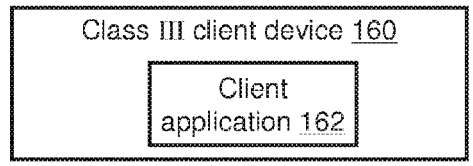

FIGS. 2A, 2B, and 2C illustrate block diagrams of examples of a class I client device 160, a class II client device 160, and a class III client device 160, respectively, of the client-server computing system. Class I client device 160, class II client device 160, and class III client device 160 are used by users 150 to access hosting service 105 remotely. A class I client device 160 has the greatest amount of functionality, a class II client device 160 has a lower amount of functionality than the class I client device 160, and a class III client device 160 has a yet lower amount of functionality than that of a class II client device 160.

For example, a class I client device 160 is a computing device that includes an instance of client application 162. Further, installed and running natively on a class I client device 160 are instances of certain types of document editors 112 and/or document viewers 114, which are described with reference to FIG. 1. Additionally, a class I client device 160 includes a remote access service 164 that allows the class I client device 160 to act as an application server in substantially the same way that host computers 110 serve as application servers. Accordingly, remote access service 164 of a class I client device 160 is substantially the same as remote access service 116 of host computers 110, as described in FIG. 1. One difference between class I client devices 160 and host computers 110 is that documents can be stored permanently on class I client devices 160. This makes it possible for users 150 to share documents without having the source document ever leave their own computer. Remote users 150 may view and edit the document via remote control, but the document and all legal rights associated with it remain with its owner. In summary, a class I client device 160 may provide document editing and viewing capability via document editors 112 and document viewers 114, as well as application server capability via remote access service 164 and document storage via the computer's file system. Examples of class I client devices 160 may include, but are not limited to, desktop computers and laptop computers.

A class II client device 160 is substantially the same as a class I client device 160 except that it does not include remote access service 164. Consequently, a class II client device 160 can not act as an application server. In summary, a class II client device 160 may provide document editing and viewing capability via document editors 112 and document viewers 114, but without application server capability. Examples of class II client devices 160 may include, but are not limited to, desktop computers and laptop computers.

Finally, a class III client device 160 has limited or no document editing and viewing capability and no application server capability. Consequently, a class III client device 160 mainly provides a remote connection (via client application 162) to document sharing service 122 of hosting service 105. Examples of class III client devices 160 may include, but are not limited to, handheld computing devices, mobile phones, and tablet devices.

Referring to FIGS. 1, 2A, 2B, and 2C, a user's class I client device 160 is registered with document sharing service 122 and may be used as the first option for hosting document editor/viewer applications for the particular user 150 who is the owner of the class I client device 160. For example, a particular user 150 has both a class III client device 160 and a class I client device 160; however, the user 150 chooses to authenticate to document sharing service 122 using his/her class III client device 160. Then using the class III client device 160, the user 150 attempts to create a Microsoft® Word document. However, the user's class III client device 160 does not have Microsoft® Word running natively thereon. Client application 162 of the class III client device 160 detects the absence of Microsoft® Word on the class III client device 160 and issues an application request to document sharing service 122. In response, document sharing service 122 determines what other computers of hosting service 105 have Microsoft® Word.

In one example, if the user's class I client device 160 is registered with document sharing service 122 and has Microsoft® Word, document sharing service 122 selects the class I client device 160 to host the application on behalf of the user's class III client device 160, rather than selecting one of the host computers 110. Then, document sharing service 122 "remotes" the interface for Microsoft® Word to the user's class III client device 160 and, using remote access service 164 of the user's class I client device 160, the document may be created. In this scenario, the user 150 is essentially hosting his/her own document editor/viewer applications (via document editors 112 and/or document viewers 114 of the class I client device 160) and the amount of data that is routed through document sharing service 122 is minimized. In addition, the documents and content that the user 150 creates remains on the user 150's own computers.

The client-server computing system 100 of the disclosure is not limited to a particular user 150 hosting his/her own document editor/viewer applications via his/her class I client device 160. A first user 150 may grant access to other users 150 to use the first user 150's class I client device 160. In this way, a first user 150 may provide hosting services to other users 150, which is another way of minimizing data that is routed through document sharing service 122. For example, multiple users 150 may establish relationships to one another in similar fashion to social networking methods. Namely, users 150 may have "contacts" lists or "friends" lists with selectable permissions that allow users 150 to host document editor/viewer applications for each other using their respective class I client devices 160. Multiple users 150 may simultaneously access a class I client device 160 and work independently in private sessions.

In another example, if none of the user's client devices 160 (regardless of class) have Microsoft® Word running natively thereon, document sharing service 122 selects one of the host computers 110 to host the application on behalf of the user's client device 160. In this scenario, hosting service 105 is hosting the document editor/viewer application and all data is routed through document sharing service 122.

Because of the three different classes of client devices 160, three different levels of service with different price points may be offered to users 150 of hosting service 105 of client-server computing system 100. For example, hosting service 105 of the disclosure provides a base level of service that supports class II client devices 160 only, which is essentially the capability of conventional document sharing systems. However, hosting service 105 of the disclosure provides another level of service (beyond that of conventional document sharing systems) that supports class II client devices 160 and that also allows a user 150 to host his/her own application via his/her class I client device 160. Namely, document sharing service 122 facilitates the use of a class I client device 160 as a host. Hosting service 105 of the disclosure provides yet another level of service (again beyond that of conventional document sharing systems) that supports both the capability of a user 150 to host his/her own document editor/viewer applications via his/her class I client device 160 and the capability of a user 150 to access host computers 110. The three levels of service may be offered at three different price points because each level of service is more expensive to provide. Namely, the more data that is routed through document sharing service 122, the higher the cost. FIGS. 3 through 9 describe examples of methods to facilitate, among other things, the aforementioned operations.

Figure 3:
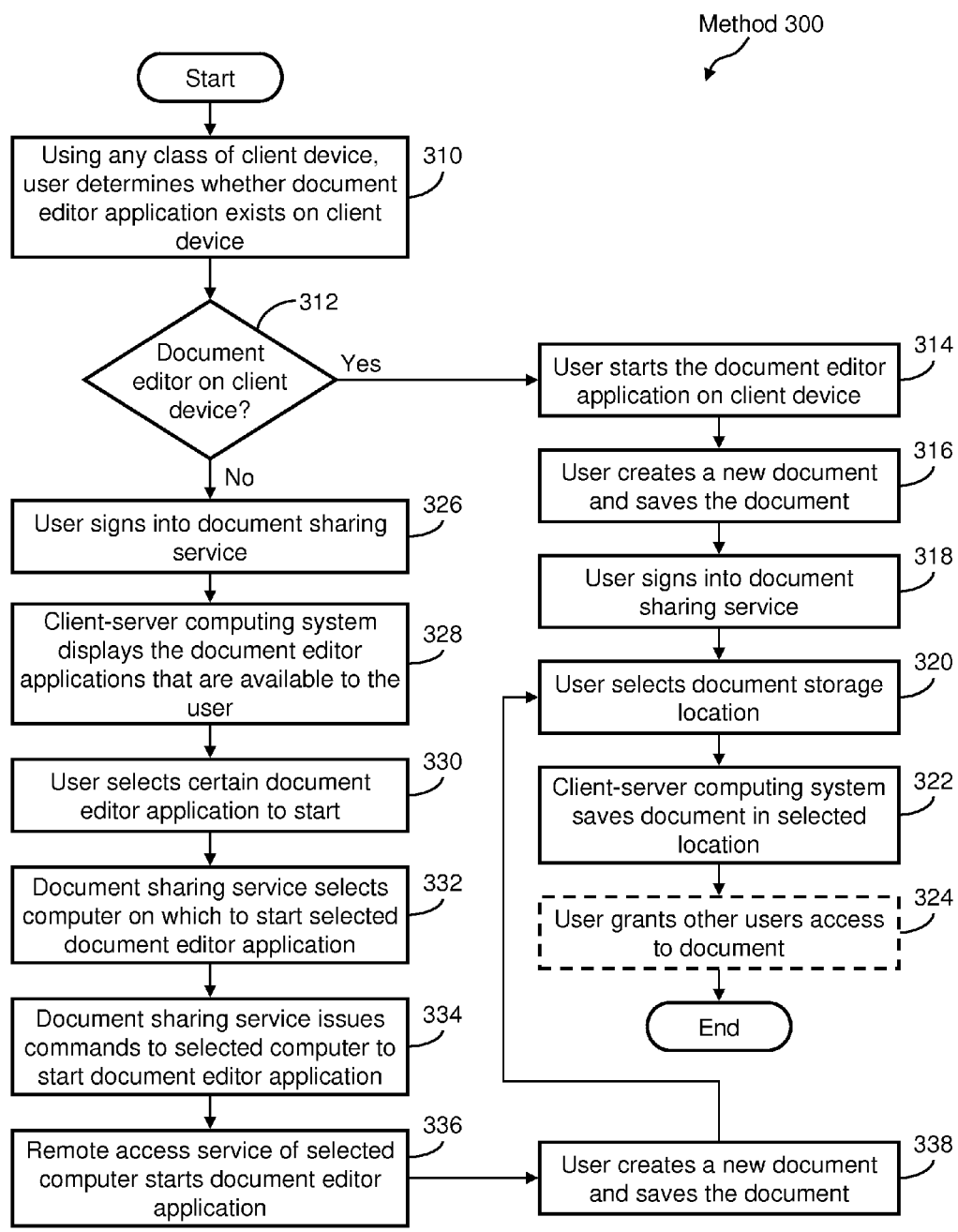
FIG. 3 illustrates an example of a flow diagram of a method of creating a document and saving to the document sharing service of the client-server computing system, according to the present disclosure.

FIG. 3 illustrates an example of a flow diagram of a method 300 of creating a document and saving the document to document sharing service 122 of client-server computing system 100, by which the document may be shared. Method 300 may include, but is not limited to, the following steps.

At step 310, using any class I client device 160, class II client device 160, or class III client device 160, the user 150 determines whether the desired document editor 112 exists on his/her client device 160. In one example, if the user 150 desires to create a CAD drawing (i.e., a .dwg file) the user 150 determines whether an AutoCAD® application exists on his/her client device 160.

At a decision step 312, if the user 150 determines that the desired document editor 112 (e.g., the AutoCAD® application) exists on his/her client device 160, method 300 proceeds to step 314. However, if the user 150 determines that the desired document editor 112 (e.g., the AutoCAD® application) does not exist on his/her client device 160, then method 300 proceeds to step 326.

At a step 314, the user 150 starts the desired document editor 112 on his/her client device 160 and the interface of the particular type of document editor 112 is displayed on the client device 160. Continuing the example, the user 150 starts the AutoCAD® application on his/her client device 160 and the interface of the AutoCAD® application is displayed on the client device 160.

At a step 316, using a class I client device 160, class II client device 160, or class III client device 160, the user 150 creates a new document 132 using the document editor 112 that is on his/her client device 160. The user 150 then saves the document 132 on his/her client device 160. Continuing the example, the user 150 creates a new CAD drawing (i.e., .dwg file) using the AutoCAD® application that is on his/her client device 160. The user 150 then saves the CAD drawing on his/her client device 160.

At a step 318, using client application 162 of the user's class I client device 160, class II client device 160, or class III client device 160, the user 150 signs into the document sharing service 122 and a standard authentication process is performed that allows the user 150 to access document editors 112 of host computers 110-1 through 110-*n* and document database 130. User-sign in may occur a number of ways. In one example, the user 150 may manually browse to the website of document sharing service 122 and enter credentials (e.g., username and password). In another example, the user sign-in process may occur automatically when the user 150 starts his/her client device 160. Namely, as part of the setup process to use document sharing service 122, the user 150 creates an account with the service and enters credentials. The account information and credentials is saved locally on the user's client device 160. Then the user 150 may select the option to automatically start document sharing service 122 when the client device 160 is started.

At step 320, user 150 selects the storage location for document 132. This selection is either made via client application 162 or via document editor 112's file dialog, in which the dialog displays the computer's local file system, network shares, and, optionally, a mapped drive or directory that provides access to document database 130 via document sharing service 122 and client application 162. In one example, user 150 chooses to store the document 132 (e.g., the CAD drawing) on document database 130. In another example, user 150 chooses to store the document 132 (e.g., the CAD drawing) locally on his/her client device 160. The capability that allows a user 150 to store documents 132 locally on his/her client device 160 and then share these documents with other users 150 is an advantage that hosting service 105 of the disclosure provides over conventional document sharing systems.

At a step 322, based on the user's selection at step 320, the document 132 is either uploaded to document database 130 or stored locally on the user 150's client device 160. For example, if at step 320 user 150 selects document database 130, client application 162 initiates the document upload process and document sharing service 122 uploads the document 132 (e.g., the CAD drawing) to document database 130 and the document 132 is now available for sharing. Alternatively, if at step 320 the user 150 chooses to store the document 132 (e.g., the CAD drawing) locally on his/her client device 160, document editor 112 saves the document to the selected location. From this step, method 300 may end or proceed to optional step 324.

At an optional step 324, the user 150 grants other users 150 access to the document 132 (e.g., the CAD drawing) that is stored in document database 130 or stored locally on his/her client device 160. Namely, the user 150 enters the access control entries for the document 132. For example, in an enterprise environment, a given user 150 may be granted visibility to certain other users 150. To facilitate this, document sharing service 122 may provide a user interface by which a user 150 may select a certain document 132 and then select users 150 (and/or groups) that may have access to the selected document 132. Additionally, the user 150 may make the document 132 public so that any user 150 can access it. Method 300 ends.

At a step 326, using client application 162 of the user's class I client device 160, class II client device 160, or class III client device 160, the user 150 signs into the document sharing service 122 and a standard authentication process is performed that allows the user 150 to access document editors 112 of host computers 110-1 through 110-*n* and document database 130. The user sign-in process may be as described with reference to step 318.

At a step 328, client-server computing system 100 displays the document editors 112 and document viewers 114 that are available to the authenticated user 150. More specifically, a list of document editors 112 and document viewers 114 to which the user 150 has rights and privileges is published by document sharing service 122 and displayed on the user's class I client device 160, class II client device 160, or class III client device 160.

These document editors 112 may exist on any of the host computers 110-1 through 110-*n* of hosting service 105 and any class I client devices 160 on which the user has rights to create documents. The capability that allows a particular user 150 to host his/her own document editors 112 and document viewers 114 is an advantage that hosting service 105 of the disclosure provides over conventional document sharing systems.

At a step 330, using client application 162 of the user's class I client device 160, class II client device 160, or class III client device 160, the user 150 selects a certain type of document editor 112 that corresponds to the type of document the user 150 wishes to create. If user 150 wants to create a document on a specific class I client device 160, the user may explicitly choose a document editor 112 that is installed on the desired client device 160. Continuing the example, if the user 150 desires to create a CAD drawing (i.e., a .dwg file) the user 150 may select an AutoCAD® application, which is one of the listed document editors 112.

At a step 332, if the user 150 has not, at step 330, explicitly or implicitly selected a specific class I client device 160 on which to start document editor 112, document sharing service 122 selects the computer on which to start the document editor 112 selected in step 330. The choice of computers includes host computers 110-1 through 110-*n* of hosting service 105 and any class I client device 160 on which the user has rights to create documents. The capability that allows class I client devices 160 to be included in the choices for hosting an application is an advantage that hosting service 105 of the disclosure provides over conventional document sharing systems. More specifically, in this step, the computer is selected according to a method 500 of FIG. 5. Continuing the example, according to method 500 of FIG. 5, document sharing service 122 selects host computer 110-2 for running the AutoCAD® application on behalf of the user's class I client device 160, class II client device 160, or class III client device 160.

At a step 334, document sharing service 122 issues commands to the computer selected in step 332 to start the document editor 112 selected in step 330. Continuing the example, document sharing service 122 issues commands to host computer 110-2 to start the AutoCAD® application.

At a step 336, remote access service 116 of the computer selected in step 332 starts the document editor 112 selected in step 330 and client-server computing system 100 "remotes" the user interface to the client device 160. Continuing the example, remote access service 116 of host computer 110-2 starts the AutoCAD® application and the user interface thereof is displayed on the user's class I client device 160, class II client device 160, or class III client device 160.

At a step 338, using a class I client device 160, class II client device 160, or class III client device 160, the user 150 creates a new document 132 using the document editor 112 that is being accessed remotely. Continuing the example, the user 150 creates a new CAD drawing (i.e., .dwg file) using the AutoCAD® application of host computer 110-2 that is being accessed remotely. Method returns to step 320.

Figure 4:
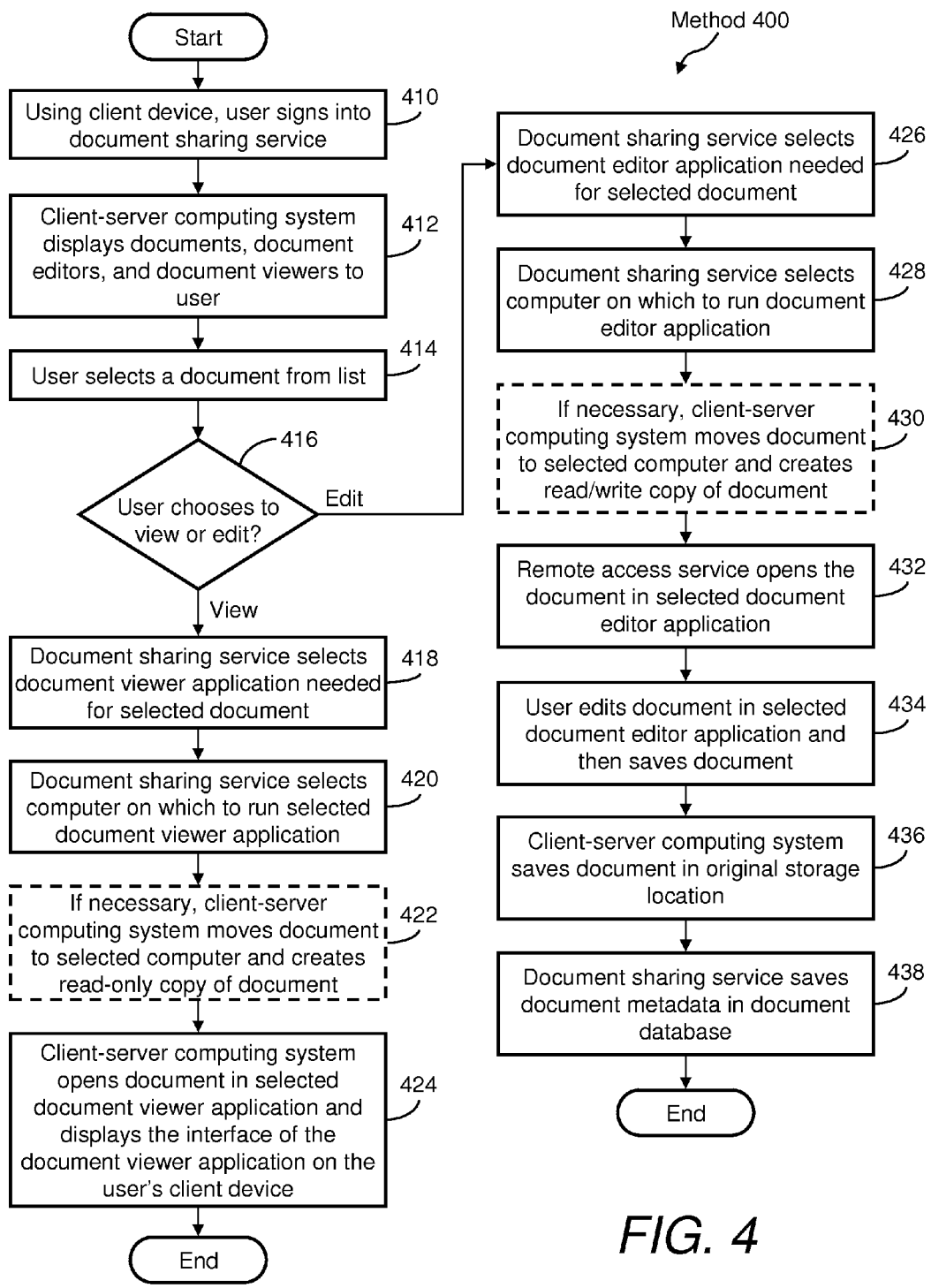
FIG. 4 illustrates an example of a flow diagram of a method of a user accessing a document available through the document sharing service of the client-server computing system, according to the present disclosure.

FIG. 4 illustrates an example of a flow diagram of a method 400 of a user 150 accessing a document 132 that is available through document sharing service 122 of hosting service 105 of client-server computing system 100. Method 400 may include, but is not limited to, the following steps.

At a step 410, using client application 162 of the user's class I client device 160, class II client device 160, or class III client device 160, the user 150 signs into the document sharing service 122 and a standard authentication process is performed that allows the user 150 to access document editors 112 of host computers 110-1 through 110-*n* and document database 130. The user sign-in process may be as described with reference to step 318 of method 300 of FIG. 3.

At a step 412, client-server computing system 100 displays the documents 132 as well as the document editors 112 and document viewers 114 that are available to the authenticated user 150. More specifically, a list of documents 132 in document database 130 and/or documents 132 on class I client devices 160 to which the user 150 has rights and privileges is published by document sharing service 122 and displayed on the user's class I client device 160, class II client device 160, or class III client device 160. These may be documents 132 the user 150 has created as well as documents 132 that other users 150 are sharing. The list of documents 132 may be presented in a hierarchical file structure by which the user 150 can browse files and folders, such as a virtual file structure.

Similarly, a list of document editors 112 and document viewers 114 to which the user 150 has rights and privileges is published by document sharing service 122 and displayed on the user's class I client device 160, class II client device 160, or class III client device 160.

At a step 414, user 150 selects a certain document 132 from the list presented in step 412.

At a decision step 416, the user 150 chooses to open the selected document 132 in a view mode (i.e., read-only mode) or in edit mode (i.e., read/write mode). In some cases, predetermined access rights for the user 150 may automatically dictate view-only rights vs. edit rights to the selected document 132. If the user 150 selects view mode, method 400 proceeds to step 418. However, if the user 150 selects edit mode, then method 400 proceeds to step 426.

At a step 418, document sharing service 122 selects a certain type of document viewer 114 that corresponds to the type of document 132 that the user 150 selected in step 414. Document sharing service 122 is tracking the document viewers 114 that are available to the user 150, both locally on the user's client device 160 and remotely on host computers 110 and class I client devices 160. In one example, if the user 150 desires to view a Microsoft® PowerPoint file, document sharing service 122 selects a PowerPoint viewer application, which is one of the listed document viewers 114.

At a step 420, document sharing service 122 selects the computer on which to start the document viewer 114 selected in step 418. The choice of computers includes host computers 110-1 through 110-*n* of hosting service 105, any class I client devices 160 to which the user 150 has access rights, and any class II client device 160. Again, the capability that allows class I client devices 160 to be included in the choices for hosting an application is an advantage that hosting service 105 of the disclosure provides over conventional document sharing systems. More specifically, in this step, the computer is selected according to method 500 of FIG. 5. Continuing the example, according to method 500 of FIG. 5, document sharing service 122 selects host computer 110-2 for running the PowerPoint viewer application on behalf of the user's class I client device 160, class II client device 160, or class III client device 160.

At an optional step 422, if the document 132 selected in step 414 is stored in document database 130 or if the document 132 is not stored on the computer selected in step 420, the document 132 is moved to the computer selected in step 420 and client application 162 or remote access service 116 creates a read-only copy of the selected document 132 on the selected computer. Continuing the example, if the Microsoft® PowerPoint file (e.g., .ppt file) is stored in document database 130 or if the Microsoft® PowerPoint file is not stored on host computer 110-2, the Microsoft® PowerPoint file is moved to host computer 110-2 and remote access service 116 creates a read-only copy of the Microsoft® PowerPoint file on host computer 110-2.

At a step 424, client application 162 or remote access service 116 opens the document 132 selected in step 414 in the document viewer 114 selected in step 418. Continuing the example, remote access service 116 displays the interface of the Microsoft® PowerPoint viewer (or in the full version of Microsoft® PowerPoint) on the user's client device 160 via client application 162, then displays the Microsoft® PowerPoint file (e.g., .ppt file) in read-only mode to the user 150 on the user's client device 160. Method 400 ends.

At a step 426, document sharing service 122 selects a certain type of document editor 112 that corresponds to the type of document 132 that the user 150 selected in step 414. Document sharing service 122 is tracking the document editors 112 that are available to the user 150, both locally on the user's client device 160 and remotely on host computers 110. In one example, if the user 150 desires to edit a Microsoft® PowerPoint file, document sharing service 122 selects a PowerPoint editor application, which is one of the listed document editors 112.

At a step 428, document sharing service 122 selects the computer on which to start the document editor 112 selected in step 426. The choice of computers includes host computers 110-1 through 110-n of hosting service 105, any class I client devices 160 to which the user 150 has access rights, and any class II client device 160. Again, the capability that allows class I client devices 160 to be included in the choices for hosting an application is an advantage that hosting service 105 of the disclosure provides over conventional document sharing systems. More specifically, in this step, the computer is selected according to method 500 of FIG. 5. Continuing the example, according to method 500 of FIG. 5, document sharing service 122 selects host computer 110-2 for running the PowerPoint application on behalf of the user's class I client device 160, class II client device 160, or class III client device 160.

At an optional step 430, if the document 132 selected in step 414 is stored in document database 130 or on a computer other than the computer selected in step 428, the document 132 is moved to the computer selected in step 428 and client application 162 or remote access service 116 creates a read/write copy of the selected document 132 on the selected computer. Continuing the example, if the Microsoft® PowerPoint file (e.g., .ppt file) is stored in document database 130 or stored on a computer other than host computer 110-2, client-server computing system 100 moves the Microsoft® PowerPoint file to host computer 110-2 and remote access service 116 creates a read/write copy of the Microsoft® PowerPoint file on host computer 110-2.

At a step 432, client application 162 or remote access service 116 opens the document 132 selected in step 414 in the document editor 112 selected in step 426. Continuing the example, remote access service 116 opens the Microsoft® PowerPoint file (e.g., .ppt file) in the PowerPoint editor application and displays the file to the user 150 on the user's client device 160.

At a step 434, using a class I client device 160, class II client device 160, or class III client device 160, the user 150 edits the document 132 selected in step 414. The user 150 then saves the document 132 on the computer selected in step 428. Continuing the example, the user 150 edits the Microsoft® PowerPoint file using the PowerPoint editor application of host computer 110-2 that is being accessed remotely. The user 150 then saves the Microsoft® PowerPoint file (e.g., .ppt file) on host computer 110-2.

At a step 436, document 132 is saved to its original location. Client-server computing system 100 may overwrite the original document, retain the original document or save only the differences from the original document. If the computer selected in step 428 is a class I client device 160 or class II client device 160 and the document was obtained from the document database 130, remote access service 116 or client application 162 transmits the document 132 to document sharing service 122. Then, document sharing service 122 saves document 132 (e.g., the PowerPoint file or .ppt file) from the class I client device 160 or class II client device 160 to document database 130. However, if the computer selected in step 428 is a host computer 110 (e.g., host computer 110-2), remote access service 116 of the host computer 110 automatically transmits document 132 (e.g., the PowerPoint file) from the host computer 110 to document sharing service 122, which then saves document 132 in document database 130.

At a step 438, document sharing service 122 saves the metadata of the document 132 in document database 130. Continuing the example, document sharing service 122 saves the metadata associated with PowerPoint file (e.g., .ppt file) in document database 130. The metadata may include, for example, the username of the user 150 who edited the document 132, a timestamp, a record of the original source document 132, document version information, any other relevant information, and the like. Method 400 ends.

Figure 5:
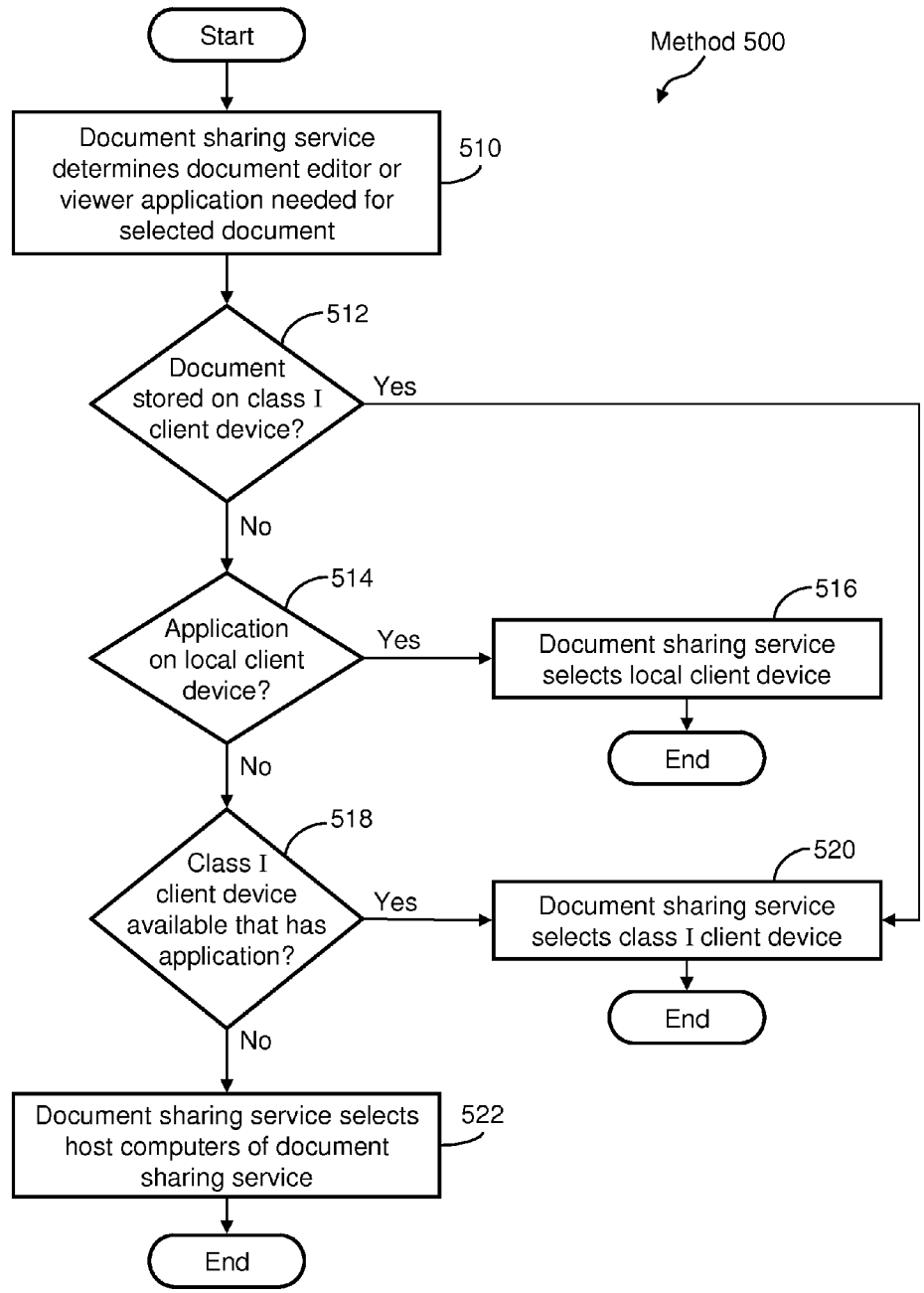
FIG. 5 illustrates a flow diagram of a method of selecting a computer of the client-server computing system on which to launch the requested document editor/viewer application, according to the present disclosure.

FIG. 5 illustrates a flow diagram of a method 500 of selecting a computer of client-server computing system 100 on which to launch the requested document editor/viewer application. In the process of selecting a computer, the lowest cost option is to select a class I client device 160 to host document editor/viewer applications ahead of selecting a host computer 110. This is because selecting a class I client device 160 minimizes the amount of data routed through the document sharing service 122. Method 500 is used to facilitate this process. Method 500 may include, but is not limited to, the following steps.

At a step 510, document sharing service 122 determines the type of document editor 112 or document viewer 114 needed for the type of document 132 to be processed. For example, if the document 132 to be processed is a Microsoft® Word document (i.e., a .doc file), document sharing service 122 determines the type of document editor 112 to be the Microsoft® Word application.

At a decision step 512, document sharing service 122 determines whether the document 132 of interest (e.g., the Microsoft® Word document) is stored on any class I client device 160 to which the user 150 has access rights. If the document 132 of interest is stored on a class I client device 160, method 500 proceeds to step 520. However, if the document 132 of interest is not stored on a class I client device 160, method 500 proceeds to step 514.

At a decision step 514, client application 162 of the client device 160 from which the request originates determines whether the document editor 112 or document viewer 114 determined in step 510 is installed on the request-originating client device 160. Continuing the example, client application 162 determines whether the Microsoft® Word application is installed on the request-originating client device 160. If yes, method 500 proceeds to step 516. However, if no, then method 500 proceeds to step 518.

At a step 516, document sharing service 122 selects the request-originating client device 160, which may be a class I client device 160, class II client device 160, or class III client device 160. Method 500 ends.

At a decision step 518, document sharing service 122 determines whether a class I client device 160 is available to the user 150 that has the document editor 112 or document viewer 114 determined in step 510 installed thereon. The class I client device 160 may be the user 150's own client device or another user 150's class I client device 160 to which the requesting user has access. If a class I client device 160 is available to the user 150, method 500 proceeds to step 520. However, if no class I client device 160 is available to the user 150, then method 500 proceeds to step 522.

At a step 520, document sharing service 122 selects the class I client device 160. Method 500 ends.

At a step 522, document sharing service 122 selects one of the host computers 110 of hosting service 105. For example, if the user 150 has a session already running on a certain host computer 110, that particular host computer 110 may be selected. However, if the user 150 does not already have a session running on any host computer 110, a load-balancing algorithm may be used to select a particular host computer 110 that has the lightest load. Method 500 ends.

Figure 6:
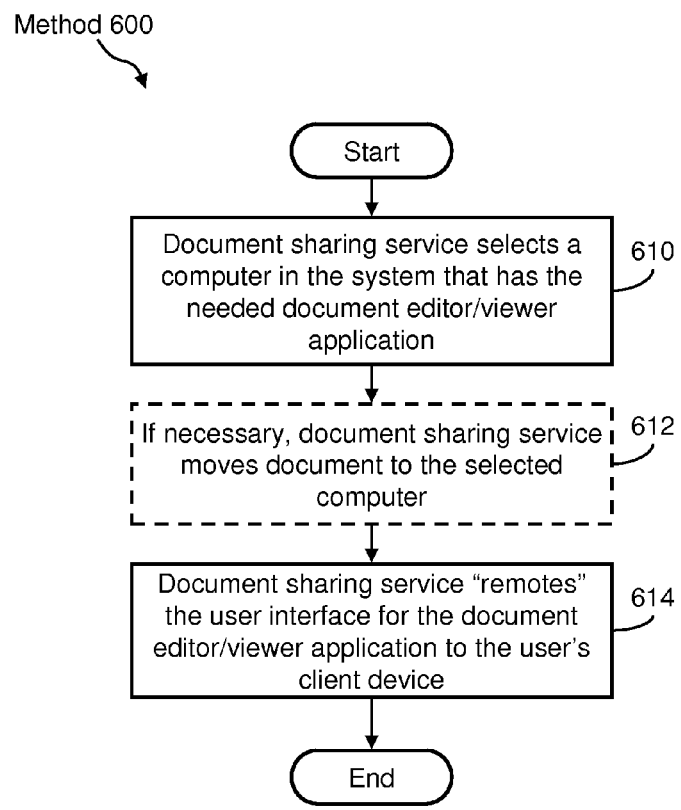
FIG. 6 illustrates an example of a flow diagram of a method of providing a document sharing service in combination with remote access to document editor and/or viewer applications, according to a minimum configuration of the present disclosure.

FIG. 6 illustrates an example of a flow diagram of a method 600 of providing a document sharing service in combination with remote access to document editor and/or viewer applications, according to a minimum configuration of the present disclosure. Namely, if a user 150 is attempting to edit/view a document of a certain file format through document sharing service 122 and the user's client device 160 does not support the particular file format, method 600 is performed according to the following steps.

At a step 610, document sharing service 122 selects a certain host computer 110 or a certain class I client device 160 in client-server computing system 100 that has the document editor 112 or document viewer 114 that is needed to process a certain type of document 132 (i.e., to process a certain file type).

At an optional step 612, if the document 132 is stored in the document database 130 or on a computer other than the computer selected at step 610, document sharing service 122 moves the document 132 to the host computer 110 or class I client device 160 selected at step 610.

At a step 614, document sharing service 122 "remotes" the user interface for the document editor 112 or document viewer 114 to the user's client device 160.

Figure 7:
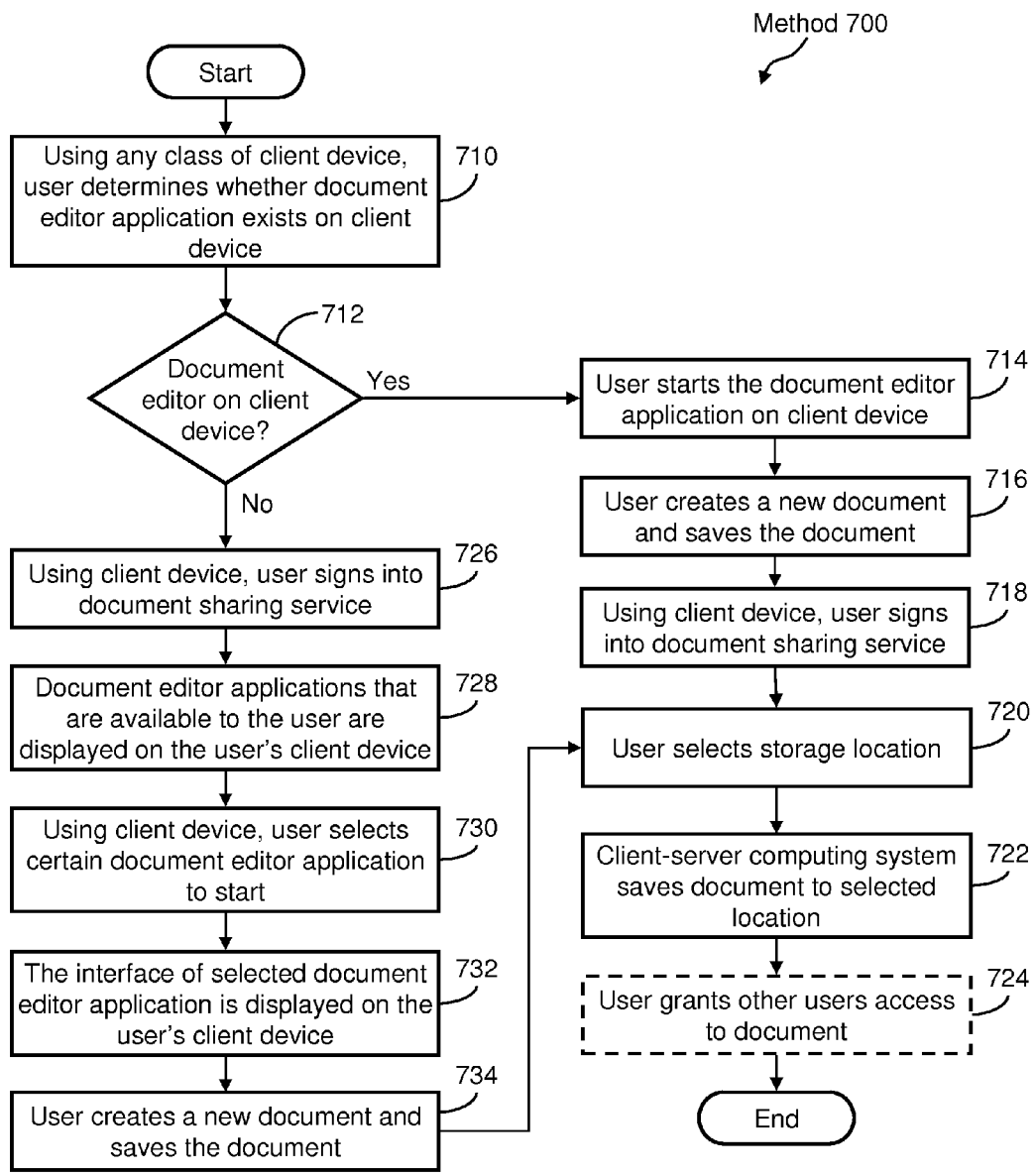
FIG. 7 illustrates an example of a flow diagram of a method of using a client device to create a document and save the document to the document sharing service of the client-server computing system, according to the present disclosure.

FIG. 7 illustrates an example of a flow diagram of a method 700 of using a client device 160 to create a document and save the document to document sharing service 122 of client-server computing system 100. Method 700 may include, but is not limited to, the following steps.

At step 710, using any class I client device 160, class II client device 160, or class III client device 160, the user 150 determines whether the desired document editor 112 exists on his/her client device 160. In one example, if the user 150 desires to create a CAD drawing (i.e., a .dwg file) the user 150 determines whether an AutoCAD® application exists on his/her client device 160.

At a decision step 712, if the user 150 determines that the desired document editor 112 (e.g., the AutoCAD® application) exists on his/her client device 160, method 700 proceeds to step 714. However, if the user 150 determines that the desired document editor 112 (e.g., the AutoCAD® application) does not exist on his/her client device 160, then method 700 proceeds to step 724.

At a step 714, the user 150 starts the desired document editor 112 on his/her client device 160 and the interface of the particular type of document editor 112 is displayed on the client device 160. Continuing the example, the user 150 starts the AutoCAD® application on his/her client device 160 and the interface of the AutoCAD® application is displayed on the client device 160.

At a step 716, using a class I client device 160, class II client device 160, or class III client device 160, the user 150 creates a new document 132 using the document editor 112 that is on his/her client device 160. The user 150 then saves the document 132 on his/her client device 160. Continuing the example, the user 150 creates a new CAD drawing (i.e., .dwg file) using the AutoCAD® application that is on his/her client device 160. The user 150 then saves the CAD drawing on his/her client device 160.

At a step 718, using client application 162 of the user's class I client device 160, class II client device 160, or class III client device 160, the user 150 signs into the document sharing service 122 and a standard authentication process is performed that allows the user 150 to access document editors 112 of host computers 110-1 through 110-n and document database 130. The user sign-in process may be as described with reference to step 318 of method 300 of FIG. 3.

At step 720, user 150 selects the storage location for document 132. This selection is either made via client application 162 or via document editor 112's file dialog, in which the dialog displays the computer's local file system, network shares, and, optionally, a mapped drive or directory that provides access to document database 130 via document sharing service 122 and client application 162. In one example, user 150 chooses to store the document 132 (e.g., the CAD drawing) on document database 130. In another example, user 150 chooses to store the document 132 (e.g., the CAD drawing) locally on his/her client device 160. The capability that allows a user 150 to store documents 132 locally on his/her client device 160 and then share these documents with other users 150 is an advantage that hosting service 105 of the disclosure provides over conventional document sharing systems.

At a step 722, based on the user's selection at step 720, the document 132 is either uploaded to document database 130 or stored locally on the user 150's client device 160. For example, if at step 720 user 150 selects document database 130, client application 162 initiates the document upload process and document sharing service 122 uploads the document 132 (e.g., the CAD drawing) to document database 130 and the document 132 is now available for sharing. Alternatively, if at step 720 the user 150 chooses to store the document 132 (e.g., the CAD drawing) locally on his/her client device 160, document editor 112 saves the document to the selected location. From this step, method 700 may end or proceed to optional step 724.

At an optional step 724, the user 150 grants other users 150 access to the document 132 (e.g., the CAD drawing) that is stored in document database 130 or stored locally on his/her client device 160. Namely, using his/her client device 160, the user 150 enters the access control entries for the document 132. Method 700 ends.

At a step 726, using client application 162 of the user's class I client device 160, class II client device 160, or class III client device 160, the user 150 signs into the document sharing service 122. The user sign-in process may be as described with reference to step 318 of method 300 of FIG. 3.

At a step 728, the document editors 112 and document viewers 114 that are available to the authenticated user 150 are displayed on the user's client device 160. More specifically, a list of document editors 112 and document viewers 114 to which the user 150 has rights and privileges is displayed on the user's class I client device 160, class II client device 160, or class III client device 160.

At a step 730, using client application 162 of the user's class I client device 160, class II client device 160, or class III client device 160, the user 150 selects and starts a certain type of document editor 112 that corresponds to the type of document the user 150 wishes to create. Continuing the example, if the user 150 desires to create a CAD drawing (i.e., a .dwg file) the user 150 may select and start an AutoCAD® application, which is one of the listed document editors 112.

At a step 732, the interface of the document editor 112 selected in step 730 is displayed on the user's client device 160. Continuing the example, the AutoCAD® application is displayed on the user's class I client device 160, class II client device 160, or class III client device 160.

At a step 734, using a class I client device 160, class II client device 160, or class III client device 160, the user 150 creates a new document 132 using the document editor 112 that is being accessed remotely. Continuing the example, the user 150 creates a new CAD drawing (i.e., .dwg file) using the AutoCAD® application. Method 700 proceeds to step 720.

Figure 8:
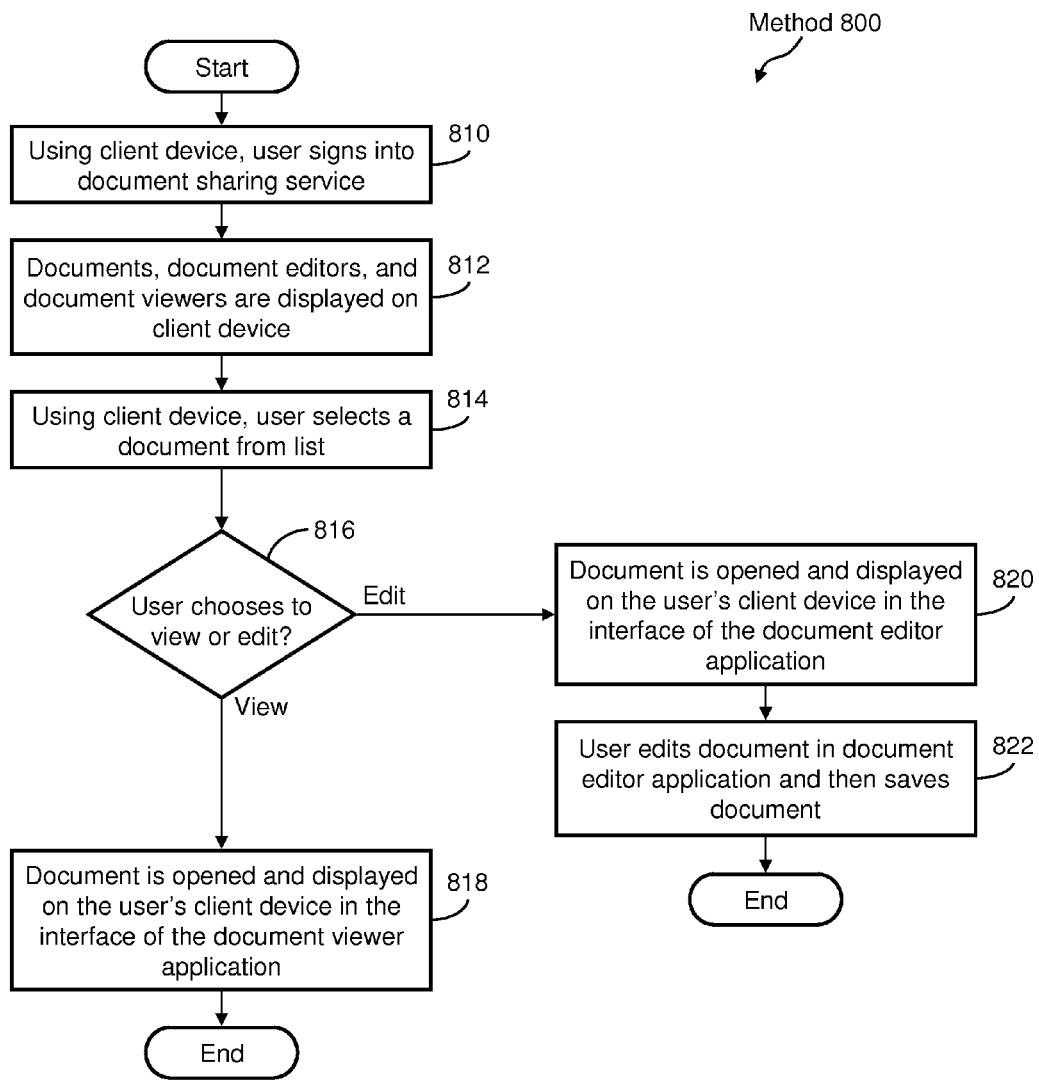
FIG. 8 illustrates an example of a flow diagram of a method of using a client device to access a document that is available through the document sharing service of the client-server computing system, according to the present disclosure.

FIG. 8 illustrates an example of a flow diagram of a method 800 of using a client device 160 to access a document 132 that is available through document sharing service 122 of hosting service 105 of client-server computing system 100. Method 800 may include, but is not limited to, the following steps.

At a step 810, using client application 162 of the user's class I client device 160, class II client device 160, or class III client device 160, the user 150 signs into the document sharing service 122. The user sign-in process may be as described with reference to step 318 of method 300 of FIG. 3.

At a step 812, documents 132, document editors 112, and document viewers 114 that are available to the authenticated user 150 are display on his/her client device 160. More specifically, a list of documents 132 in document database 130 and/or documents 132 on class I client devices 160 to which the user 150 has rights and privileges is displayed on the user's class I client device 160, class II client device 160, or class III client device 160. Similarly, a list of document editors 112 and document viewers 114 to which the user 150 has rights and privileges is displayed on the user's class I client device 160, class II client device 160, or class III client device 160.

At a step 814, using his/her client device 160, the user 150 selects a certain document 132 from the list presented in step 812.

At a decision step 816, using his/her client device 160, the user 150 chooses to open the selected document 132 in a view mode (i.e., read-only mode) or in edit mode (i.e., read/write mode). If the user 150 selects view mode, method 800 proceeds to step 818. However, if the user 150 selects edit mode, then method 800 proceeds to step 820.

At a step 818, the document 132 selected in step 814 is opened in the document viewer 114 that corresponds to the file format of the document 132. Continuing the example, the Microsoft® PowerPoint file (e.g., .ppt file) is displayed on the user's client device 160 in read-only mode in the Microsoft® PowerPoint viewer interface. Method 400 ends.

At a step 820, the document 132 selected in step 814 is opened in the document editor 112 that corresponds to the file format of the document 132. Continuing the example, the Microsoft® PowerPoint file (e.g., .ppt file) is displayed on the user's client device 160 in edit mode in the Microsoft® PowerPoint interface.

At a step 822, using a class I client device 160, class II client device 160, or class III client device 160, the user 150 edits the document 132 selected in step 814. The user 150 then saves the document 132. Continuing the example, the user 150 edits the Microsoft® PowerPoint file using the PowerPoint editor application that is being accessed remotely. The user 150 then saves the Microsoft® PowerPoint file (e.g., .ppt file).

Figure 9:
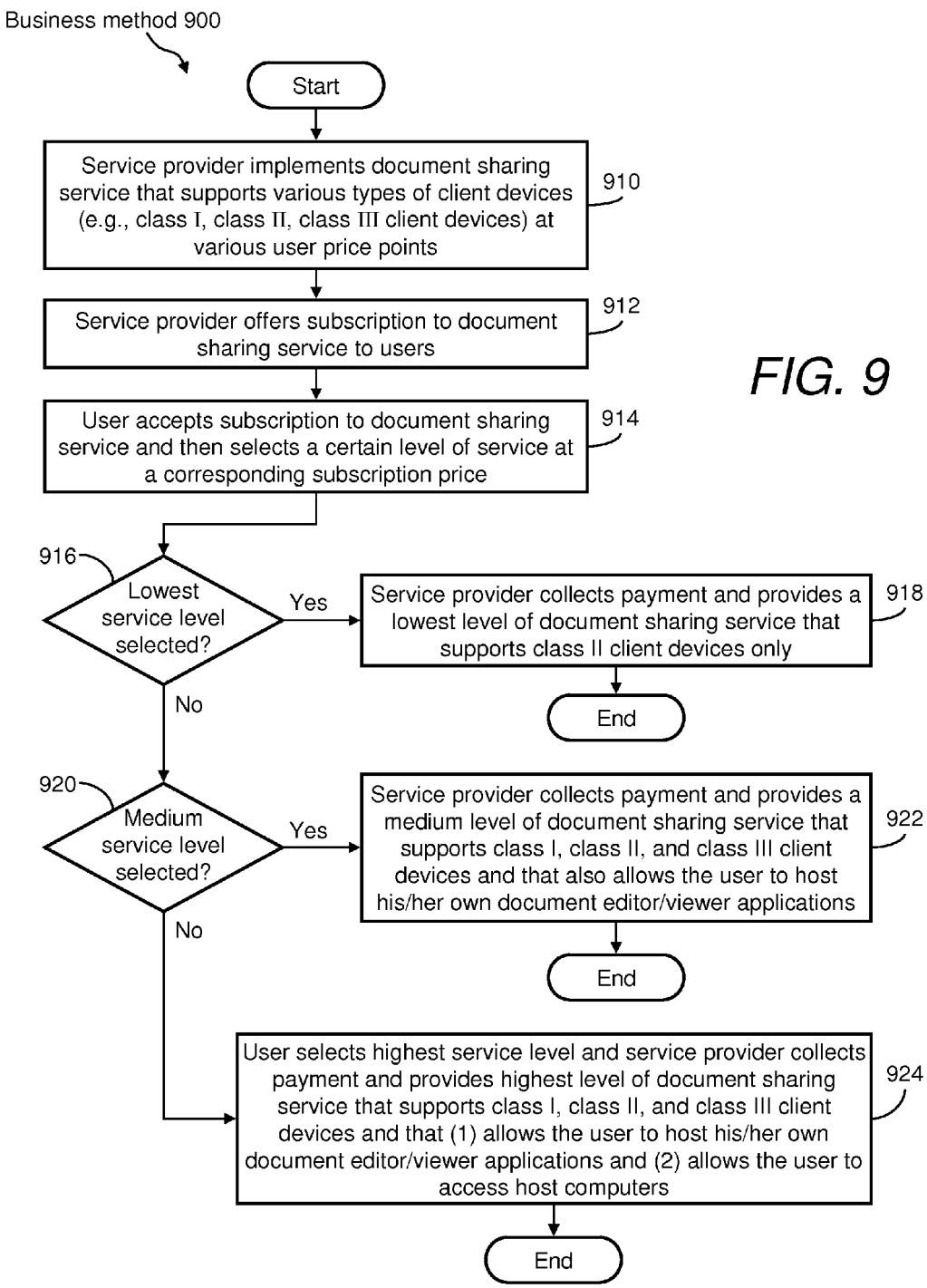
FIG. 9 illustrates an example of a flow diagram of a business method of providing the document sharing service in combination with remote access to document editor and/or viewer applications, according to the present disclosure.

FIG. 9 illustrates an example of a flow diagram of a business method 900 of providing a document sharing service in combination with remote access to document editor and/or viewer applications. The subscription price points may be based on various factors. For example, the subscription price points may be based on the amount bandwidth consumed at hosting service 105; infrastructure and software licenses required to run applications on host computers 110; the level of support for class I client devices 160, class II client devices 160, and class III client devices 160; and any combinations thereof. By way of one example, business method 900 of FIG. 9 is based on the level of support for class I client devices 160, class II client devices 160, and class III client devices 160 and the amount of access to hosting service 105. Business method 900 may include, but is not limited to, the following steps.

At a step 910, a service provider (not shown) implements document sharing service 122 of hosting service 105 that supports three types of client devices at various user price points. For example, because of the three different classes of client devices 160 (e.g., class I client devices 160, class II client devices 160, and class III client devices 160), three different levels of service with different price points may be offered to users 150 of hosting service 105 of client-server computing system 100. For example, hosting service 105 of the disclosure provides:

(1) a lowest level of service that supports class II client devices 160 only for accessing host computers 110 and document database 130;
(2) a medium level of service that supports class I client devices 160, class II client devices 160, and class III client devices 160 and that also allows a user 150 to host his/her own application via his/her class I client device 160. Namely, document sharing service 122 facilitates the use of a class I client device 160 as a host; and
(3) a highest level of service that supports class I client devices 160, class II client devices 160, and class III client devices 160 and supports both the capability of a user 150 to host his/her own document editor/viewer applications via his/her class I client device 160 and the capability of a user 150 to access host computers 110.

At a step 912, the service provider offers users 150 a subscription to document sharing service 122. The three levels of service described in step 910 may be offered at three different price points because each level of service is more expensive to provide. Namely, the more data that is routed through document sharing service 122, the higher the cost. For example, a subscription to the lowest service level may be offered to users 150 at a price of $10 per month, a subscription to the medium service level may be offered to users 150 at a price of $20 per month, and a subscription to the highest service level may be offered to users 150 at a price of $30 per month, At a step 914, a user 150 accepts a subscription to document sharing service 120 and then selects a certain level of service at a corresponding subscription price.

At a decision step 916, if the user 150 selects the lowest service level of document sharing service 122, business method 900 proceeds to step 918. However, if the user 150 does not select the lowest level of document sharing service 122, business method 900 proceeds to step 920.

At a step 918, the service provider collects payment from the user 150 for the lowest service level (e.g., $10 per month) and provides the lowest service level of document sharing service 1222, which supports class II client devices 160 only.

At a decision step 920, if the user 150 selects the medium service level of document sharing service 122, business method 900 proceeds to step 922. However, if the user 150 does not select the medium level of document sharing service 122, business method 900 proceeds to step 924.

At a step 922, the service provider collects payment from the user 150 for the medium service level (e.g., $20 per month) and provides the medium service level of document sharing service 122, which supports class I client devices 160, class II client devices 160, and class III client devices 160 and that also allows the user 150 to host his/her own document editor/viewer applications.

At a step 924, the user 150 selects the highest service level of document sharing service 122. Therefore, the service provider collects payment from the user 150 for the highest service level (e.g., $30 per month) and provides the highest service level of document sharing service 122, which supports class I client devices 160, class II client devices 160, and class III client devices 160 and that (1) allows the user to host his/her own document editor/viewer applications and (2) allows the user to access host computers Referring now to FIGS. 1 through 9, when a user 150 wishes to exit hosting service 105 of client-server computing system 100, the user 150 signs out of document sharing service 122 of document server 120. For example, using client application 162, which may be launched in a web browser on his/her client device 160, the user 150 selects certain logout controls (e.g., clicks on a logout button). In so doing, the connection to document server 120 of hosting service 105 is closed. The user 150 may then close the web browser on his/her client device 160. Alternatively, the user's session times out and the connection to document server 120 of hosting service 105 is automatically closed.

Once the user 150 signs out of document sharing service 122 or the user's session times out, document sharing service 122 of document server 120 may delete the user 150's host sessions on all host computers 110. Alternatively, the user 150's host sessions may remain running so that the user 150 can reconnect to them at a later time.

Various embodiments of the present invention allow for the method disclosed herein to be performed by an intermediary device (e.g., a cloud server), which may be associated with the host computer or reside elsewhere in the network (e.g., in the cloud). For example, a host computer of this disclosure may receive a request from a requesting client device, forward to a cloud server device, receive responsive data and forward to the client device, or visa-versa.

The invention claimed is:

1. A method for providing a document sharing service in combination with remote access to document applications, the method comprising:
    providing a client device access to a plurality of host computing devices capable of processing a document using a document sharing service on a document sharing server;
    receiving, at the document sharing server, a request from the client device to create a new document, wherein the client device does not have a document editor application for creating the new document;
    authenticating a user of the client device at the document sharing server;
    determining which of the plurality of host computing devices is capable of creating the new document indicated by the request from the client device;
    selecting one of the plurality of host computing devices to process the request based on the determination as to capability of creating the new document;
    causing the selected host computing device to start the document editor application based on the request from the client device;
    remoting a user interface for the document editor application from the selected host computing device to the client device;
    allowing the new document to be edited created through the user interface of the document editor application being accessed remotely at the client device; and
    saving the new document to a storage location of the document on the document sharing server.

2. The method of claim 1, wherein causing the selected host computing device to process the request comprises remoting a user interface for a document viewer application from the selected host computing device to the client device.

3. The method of claim 1, wherein the client device comprises a remote access service that allows the client device to act as a host computing device to other client devices.

4. The method of claim 1, wherein the client device comprises one or more applications for processing documents, and further comprising determining that the applications on the client device are not capable of processing the requested document.

5. The method of claim 1, further comprising determining that the client device is not capable of processing the requested document and providing a display regarding one or more host computing devices determined to be capable of processing the requested document.

6. The method of claim 1, further comprising charging a fee based on capabilities of the client device.

7. The method of claim 6, wherein the fee is based on an amount of bandwidth consumed at the selected computing device.

8. The method of claim 1, wherein metadata of the edited version of the document is saved in a document database.

9. The method of claim 1, wherein the new document is a new computer aided design (CAD) drawing.

10. The method of claim 1, further comprising saving the new document locally on the client device.

11. The method of claim 1, further comprising sharing the new document.

12. A system for providing a document sharing service in combination with remote access to document applications, the system comprising:
    a plurality of host computing devices capable of processing a document and accessible via a document sharing service; and
    a document sharing server for hosting the document sharing service, the document sharing server comprising:
        a communication network for receiving a request from a client device to view and create a new document, wherein the client device does not have a document editor application for creating the new document; and
        a processor for executing instructions stored in memory, wherein execution of the instructions by the processor:
            authenticates a user of the client device at the document sharing server;

determines which of the plurality of host computing devices is capable of creating the new document indicated by the request from the client device, selects one of the plurality of host computing devices to process the request based on the determination as to capability of creating the new document, causes the selected host computing device to start the document editor application based on the request from the client device;

remotes a user interface for the document editor application to the client device;

allows the new document to be created through the user interface of the document editor application being accessed remotely at the client device; and saves the new document to a storage location on the document sharing server.

13. The system of claim 12, wherein the processor executes further instructions to remote a user interface for a document viewer application to the client device.

14. The system of claim 12, wherein the client device comprises a remote access service that allows the client device to act as a host computing device to other client devices.

15. The system of claim 12, wherein the client device comprises one or more applications for processing documents, and further comprising determining that the applications on the client device are not capable of processing the requested document.

16. The system of claim 12, wherein it is determined that the client device is not capable of processing the requested document and a display is provided regarding one or more host computing devices determined to be capable of processing the requested document.

17. The system of claim 16, wherein the fee is based on an amount of bandwidth consumed at the selected computing device.

18. The system of claim 12, wherein the processor executes further instructions to charge a fee based on capabilities of the client device.

19. The system of claim 12, wherein the new document is a new computer aided design (CAD) drawing.

20. The system of claim 12, wherein the processor executes further instructions to save the new document locally on the client device.

21. The system of claim 12, wherein the processor executes further instructions to share the new document.

22. A non-transitory computer-readable storage medium, having embodied thereon a program executable by a processor to perform a method for providing a document sharing service in combination with remote access to document applications, the method comprising:

providing a client device access to a plurality of host computing devices capable of processing a document using a document sharing service on a document sharing server;

receiving, at the document sharing server, a request from the client device to create a new document, wherein the client device does not have a document editor application for creating the new document;

authenticating a user of the client device at the document sharing server;

determining which of the plurality of host computing devices is capable of creating the new document indicated by the request from the client device;

selecting one of the plurality of host computing devices to process the request based on the determination as to capability of creating the new document;

causing the selected host computing device to start the document editor application based on the request from the client device;

remoting a user interface for the document editor application from the selected host computing device to the client device;

allowing the new document to be created through the user interface of the document editor application being accessed remotely at the client device; and saving the new document to a storage location on the document sharing server.

* * * * *